US012620584B2

(12) United States Patent
Xiao et al.

(10) Patent No.: US 12,620,584 B2
(45) Date of Patent: May 5, 2026

(54) NEGATIVE ELECTRODE MATERIAL, PREPARATION METHOD THEREOF, AND LITHIUM ION BATTERY

(71) Applicants: BTR NEW MATERIAL GROUP CO., LTD., Shenzhen (CN); Dingyuan New Energy Technology Co., LTD., Huizhou (CN)

(72) Inventors: Chengmao Xiao, Shenzhen (CN); Peng He, Shenzhen (CN); Eming Guo, Shenzhen (CN); Jianguo Ren, Shenzhen (CN); Xueqin He, Shenzhen (CN)

(73) Assignees: BTR NEW MATERIAL GROUP CO., LTD., Shenzhen (CN); DINGYUAN NEW ENERGY TECHNOLOGY CO., LTD., Huizhou (CN)

( * ) Notice: Subject to any disclaimer, the term of this patent is extended or adjusted under 35 U.S.C. 154(b) by 597 days.

(21) Appl. No.: 18/006,354

(22) PCT Filed: Jun. 1, 2022

(86) PCT No.: PCT/CN2022/096668
§ 371 (c)(1),
(2) Date: Jan. 20, 2023

(87) PCT Pub. No.: WO2023/273782
PCT Pub. Date: Jan. 5, 2023

(65) Prior Publication Data
US 2023/0261183 A1 Aug. 17, 2023

(30) Foreign Application Priority Data
Jun. 30, 2021 (CN) .......................... 202110736759.6

(51) Int. Cl.
H01M 4/485 (2010.01)
H01M 4/02 (2006.01)
(Continued)

(52) U.S. Cl.
CPC ........... H01M 4/485 (2013.01); H01M 4/366 (2013.01); H01M 4/583 (2013.01); H01M 4/625 (2013.01);
(Continued)

(58) Field of Classification Search
CPC ...... H01M 4/485; H01M 4/366; H01M 4/583; H01M 4/625; H01M 10/0525;
(Continued)

(56) References Cited

U.S. PATENT DOCUMENTS

2018/0083272 A1* 3/2018 Son ..................... H10N 10/855
2019/0263666 A1 8/2019 Filtvedt

FOREIGN PATENT DOCUMENTS

CN 104091934 A 10/2014
CN 107069009 * 8/2017
(Continued)

OTHER PUBLICATIONS

ISA China National Intellectual Property Administration, International Search Report Issued in Application No. PCT/CN2022/096668, Aug. 23, 2022, WIPO, 6 pages.
(Continued)

*Primary Examiner* — Lisa S Park
(74) *Attorney, Agent, or Firm* — McCoy Russell LLP

(57) ABSTRACT

The present disclosure relates to the field of negative electrode materials, and provides a negative electrode material and a preparation method therefor, and a lithium ion battery. The negative electrode material comprises an aggregate, the aggregate comprising an active substance and a carbon material. The mass percentage of the active substance in the
(Continued)

aggregate gradually decreases from the center to the surface of the aggregate. The negative electrode material provided by the present disclosure can effectively suppress volume expansion of the negative electrode material and improve battery cycle performance.

7 Claims, 2 Drawing Sheets

(51) Int. Cl.

| | | |
|---|---|---|
| *H01M 4/36* | (2006.01) | |
| *H01M 4/583* | (2010.01) | |
| *H01M 4/62* | (2006.01) | |
| *H01M 10/0525* | (2010.01) | |

(52) U.S. Cl.
CPC .. *H01M 10/0525* (2013.01); *H01M 2004/021* (2013.01); *H01M 2004/027* (2013.01)

(58) Field of Classification Search
CPC ..... H01M 2004/021; H01M 2004/027; H01M 4/386; H01M 4/587; H01M 4/364; H01M 4/628; H01M 4/38; H01M 4/483; H01M 4/62; H01M 4/624; C01B 33/02; C01B 32/05; Y02E 60/10
See application file for complete search history.

(56) References Cited

FOREIGN PATENT DOCUMENTS

| | | | |
|---|---|---|---|
| CN | 107069009 | A | 8/2017 |
| CN | 108550857 | A | 9/2018 |
| CN | 108698835 | A | 10/2018 |
| CN | 109256534 | A | 1/2019 |
| CN | 109715556 | A | 5/2019 |
| CN | 111164803 | A | 5/2020 |
| CN | 111613774 | A | 9/2020 |
| CN | 112259708 | A | 1/2021 |
| CN | 113950758 | A | 1/2022 |
| JP | 2019079713 | A | 5/2019 |
| KR | 20180072274 | A | 6/2018 |
| KR | 20190083613 | A1 | 7/2019 |
| WO | WO2013168785 | * | 11/2013 |
| WO | 2022048962 | A1 | 3/2022 |

OTHER PUBLICATIONS

Korean Intellectual Property Office, Office Action Issued in Application No. 10-2022-7043162, Jan. 27, 2025, 24 pages.
European Patent Office, Partial Supplementary European Search Report Issued in Application No. 22831603.0, Feb. 27, 2025, Germany, 17 pages.
State Intellectual Property Office of the People's Republic of China, Office Action and Search Report Issued in Application No. 202110736759.6, Oct. 23, 2025, 19 pages. (Submitted with Partial Translation).

* cited by examiner

Figure 2:
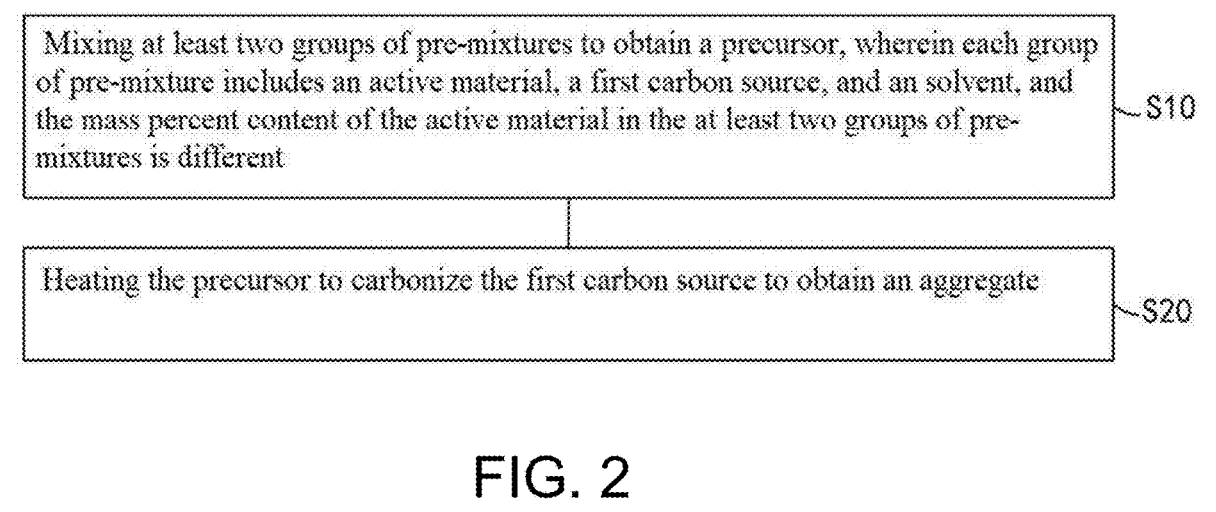

Mixing at least two groups of pre-mixtures to obtain a precursor, wherein each group of pre-mixture includes an active material, a first carbon source, and an solvent, and the mass percent content of the active material in the at least two groups of pre-mixtures is different ⎯S10

Heating the precursor to carbonize the first carbon source to obtain an aggregate ⎯S20

NEGATIVE ELECTRODE MATERIAL, PREPARATION METHOD THEREOF, AND LITHIUM ION BATTERY

CROSS REFERENCE TO RELATED APPLICATIONS

The present application is a U.S. National Phase of International Application No. PCT/CN2022/096668 entitled "NEGATIVE ELECTRODE MATERIAL AND PREPARA-TION METHOD THEREFOR, AND LITHIUM ION BAT-TERY," and filed on Jun. 1, 2022. International Application No. PCT/CN2022/096668 claims priority to Chinese Patent Application No. 202110736759.6 filed on Jun. 30, 2021. The entire contents of each of the above-listed applications are hereby incorporated by reference for all purposes.

TECHNICAL FIELD

The present disclosure relates to the field of negative electrode materials of the lithium ion battery, and the present disclosure relates to a negative electrode material a prepa-ration method thereof, and a lithium ion battery.

BACKGROUND

Lithium ion batteries are widely used in electric vehicles and consumer electronics products due to advantages of high energy density, high output power, long cycle life, and less environmental pollution. To increase battery energy density, research and development on addition of active materials in negative electrode material, such as silicon negative elec-trode material is maturing over time. However, a volume of negative electrode material is greatly expanded after addi-tion of the active material during lithium intercalation/ deintercalatio, in particular the volume of the silicon nega-tive electrode material may expand more than 300%, such that the material may be pulverized and fall off from the current collector during a charging and discharging process, and electrical connection broken between the negative active material and the current collector, resulting in poor electro-chemical performance of the negative electrode material, such as capacity fading, decreased cycling stability, and leading to difficulty in commercial applications of such negative electrode material.

Therefore, how to suppress the volumetric expansion of negative electrode material, improve the cycling stability of the negative electrode material is a problem that is now urgently to be solved.

SUMMARY

The present disclosure provides a negative electrode material including an aggregate, the aggregate includes an active material and a carbon material, the mass percent content of the active material in the aggregate is gradually reduced from a center to a surface of the aggregate.

In the above technical solution, the negative electrode material includes an aggregate, and the aggregate include an active material and a carbon material, and the active material component located at the center of the aggregate core accounts for a major proportion of the aggregate, the carbon material component accounts for a minor proportion of the aggregate, while the proportion of the active material com-ponent away from the center of the core is gradually decreasing, and the proportion of the carbon material com-ponent the is increasing. The concentration change of the active material facilitates to enrich the active material at a center location of the negative electrode material in high concentration, therefore, the expansion of the active material can be controlled inside the aggregate, thereby avoiding disruption of to the carbon layer of the surface due to an expansion effect of the active material, increasing the sta-bility of the SEI film on a surface of the negative electrode material, providing good interfacial stability, reducing a volume expansion rate of the negative electrode material having the added active material, and finally improving the cycle stability performance of the negative electrode mate-rial, and improving battery cycle performance.

In some embodiments, a mass ratio of the active material to the carbon material is gradually reduced from the center to the surface of the aggregate.

In some embodiments, a total mass ratio of the active material to the carbon material is from 0.5 to 8.

In some embodiments, the active material has a mass percent content of 5% to 90%, based on 100% by mass of the aggregate.

In some embodiments, the active material has a mass percent content of 5% to 80%, based on 100% by mass of the aggregate.

In some embodiments, the active material has a mass percent content of 2% to 55% on the surface of the aggre-gate.

In some embodiments, a maximum value of a mass ratio of the active material to the carbon material in the aggregate the is denoted as E, a minimum value thereof is denoted as F, wherein $E-F \geq 0.5$.

In some embodiments, an EDS point scan test is per-formed on a SEM section of the aggregate from any region on the surface to the center with a spectrometer, a mass ratio of the active material to the carbon material is defined as T, and N tests are performed within the region, wherein $N \geq 10$. A represents a minimum value of T in the results of the N tests, B represents a maximum value of T in the results of the N tests, a distance from any point to a center of the surface of the aggregate is $L_0$ μm, a distance of a center of a test region to the center of the aggregate is $L_1$ μm, a T value of the center position of the test region is defined as $T_0$, wherein $T_0$ satisfies a relationship: $T_0 \leq B-(B-A)L_1/L_0$.

In some embodiments, the active material comprises at least one of Li Na, K, Sn, Ge, Si, $SiO_x$, Fe, Mg, Ti, Zn, Al, Ni, P, and Cu, wherein $0<x<2$.

In some embodiments, the active material has a median particle size ranging from 1 nm to 300 nm.

In some embodiments, the carbon material comprises a graphite based carbon material and/or a non-graphite based carbon material.

In some embodiments, the graphite based carbon material comprises natural graphite and/or artificial graphite.

In some embodiments, the artificial graphite comprises mesocarbon microbeads.

In some embodiments, the non-graphite based carbon material comprises at least one amorphous carbon, crystal-line carbon, hard carbon, and soft carbon.

In some embodiments, the aggregate further comprises at least one of a metal oxide and a conductive enhancer.

In some embodiments, the metal oxide has a chemical formula of $M_xO_y$, wherein $0.2 \leq y/x \leq 3$, and m comprises at least one of Sn, Ge, Fe, Cu, Ti, Na, Mg, Al, Ca, and Zn.

In some embodiments, the metal oxide is in a form of a sheet and/or a long strip.

In some embodiments, the metal oxide has an aspect ratio greater than 2.

In some embodiments, the conductivity enhancer has a conductivity of $10^0$ s/m to $10^8$ s/m.

In some embodiments, the conductive enhancer is in a form of a sheet and/or a long strip.

In some embodiments, the conductivity enhancer has an aspect ratio of 2 to 5000.

In some embodiments, the conductive enhancer comprises at least one of an alloy material and a conductive carbon.

In some embodiments, the alloy material comprises at least one of zinc alloy, aluminum alloy, copper alloy, silicon alloy, nickel alloy, and titanium alloy.

In some embodiments, the conductive carbon comprises one of graphite fibers, carbon nanotubes, graphite sheets, conductive carbon fibers, and graphene.

In some embodiments, a mass ratio of the metal oxide to the active material is 1 to 20:100.

In some embodiments, a mass ratio of the conductive enhancer to the active material is 0.01 to 20:100.

In some embodiments, the negative electrode material further comprises a carbon layer coated on at least part of the surface of the aggregate.

In some embodiments, a material of the carbon layer comprises graphite and/or amorphous carbon.

In some embodiments, the carbon layer has a thickness of 10 nm to 2000 nm.

In some embodiments, the negative electrode material has a median particle size of 0.5 μm to 30 μm.

In some embodiments, the negative electrode material has a specific surface area of ≤10 m²/g.

In some embodiments, the aggregate has a porosity of ≤10%.

In some embodiments, the aggregate has a compressive hardness of ≥100 Mpa.

In some embodiments, the aggregate density satisfies the following relationship: $(\rho2-\rho1)/\rho2\leq5\%$, wherein ρ1 is a test density of the aggregate, ρ2 is a theoretical density of the aggregate. and ρ2 is a sum of a value of multiplying a mass percent content of each component in the aggregate and a theoretical density of the each component.

The present disclosure further discloses a method for preparing a negative electrode material, comprising the steps of:

mixing at least two groups of pre-mixtures to prepare a precursor, wherein each group of pre-mixture at least comprises an active material, a first carbon source, and a solvent, and a mass percent content of the active material in at least two groups of the pre-mixtures is different from each other. and heating the precursor so as to carbonize the first carbon source to obtain an aggregate.

In the above technical solution, by the method for preparing the negative electrode material provided by the present disclosure, the carbon source, and the solvent are mixed at different ratio to obtain multiple pre-mixtures, the pre-mixtures are mixed for heating to obtain an aggregate, and the proportion of the active material gradually increases from the surface of the particles to the center of the particles, which facilitates to inhibit the expansion rate of the negative electrode material, and the preparation process is simple and controllable.

In some embodiments, In the at least two groups of pre-mixtures, a difference between a maximum mass percent content of the active material and a minimum mass percent content of the active material in the pre-mixture is 20% to 90%.

In some embodiments, the active material comprises at least one of Li, Na, K, Sn, Ge, Si, $Sio_x$, Fe, Mg, Ti, Zn, Al, P, and Cu, wherein 0<x<2.

In some embodiments, the first carbon source comprises at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, and asphalt.

In some embodiments, the solvent comprises an organic solvent.

In some embodiments, the organic solvent comprises at least one of methanol, ethanol, ethylene glycol, propanol, isopropanol, glycerol, n-butanol, isobutanol, and pentanol.

In some embodiments, at least one group of pre-mixture further comprises at least one of an additive, a metal oxide, and a conductive enhancer.

In some embodiments, the additive comprises at least one of a surfactant and a coupling agent.

In some embodiments, the surfactant comprises at least one of n-octadecanoic acid, lauric acid, polyacrylic acid, sodium dodecyl benzene sulfonate, n-eicosanoic acid, palmitic acid, tetradecanoic acid, undecanoic acid, cetyltrimethylammonium bromide, and polyvinylpyrrolidone.

In some embodiments, the coupling agent comprises a silane coupling agent and/or a titanate coupling agent.

In some embodiments, the silane coupling agent comprises γ-aminopropyltriethoxysilane, γ-glycidoxypropyltrimethoxysilane, and/or γ-methacryloxypropyltrimethoxysilane.

In some embodiments, the metal oxide has a chemical formula of $M_xO_y$, $0.2\leq y/x\leq3$, wherein m comprises at least one of Sn, Ge, Fe, Cu, Ti, Na, Mg, Al, Ca, and Zn.

In some embodiments, the metal oxide is in a form of a sheet and/or a long strip.

In some embodiments, the metal oxide has an aspect ratio greater than 2.

In some embodiments, a mass ratio of the metal oxide to the active material is 1 to 20:100.

In some embodiments, a mass ratio of the conductive enhancer to the active material is 0.01 to 20.

In some embodiments, the conductivity enhancer has a conductivity of $10^0$ s/m to $10^8$ s/m.

In some embodiments, the conductive enhancer is in a form of a sheet and/or a long strip.

In some embodiments, the conductivity enhancer has an aspect ratio of 2 to 5000.

In some embodiments, the conductive enhancer comprises at least one of alloy material and conductive carbon.

In some embodiments, the alloy material comprises at least one of zinc alloy, aluminum alloy, copper alloy, silicon alloy, nickel alloy, and titanium alloy.

In some embodiments, the conductive carbon comprises one of graphite fibers, carbon nanotubes, graphite sheets, conductive carbon fibers, and graphene.

In some embodiments, preparing the precursor further comprises at least one of drying and dispersing the mixed pre-mixture that is mixed.

In some embodiments, the drying is performed at a temperature of 30° C. to 400° C. for 1 h to 15 h.

In some embodiments, the dispersing comprises at least one of mechanical stirring, ultrasonic dispersion, and milling dispersion.

In some embodiments, preparing the precursor further comprises centrifuging the pre-mixture that is mixed.

In some embodiments, the centrifuging is performed at a rotational speed of 100 rpm to 3000 rpm for 10 min to 60 min.

In some embodiments, the at least two groups of pre-mixtures comprise a first pre-mixture and a second pre-mixture.

In some embodiments, a mass ratio of the active material to the first carbon source in the first pre-mixture is (80-120):(1-20).

In some embodiments, a mass ratio of the active material to the first carbon source in the second pre-mixture is (40-80):(1-30).

In some embodiments, a mass percent content of the active material in the first pre-mixture is greater than or less than a mass percent content of the active material in the second pre-mixture.

In some embodiments, preparing the precursor comprise mixing the first pre-mixture and second pre-mixture to provide the precursor.

In some embodiments, preparing the precursor comprises: drying and dispersing the first pre-mixture to obtain dispersed solid particles, mixing the dispersed first pre-mixture and the second pre-mixture and drying to obtain a mixture, and drying and mixing the mixture with the a third pre-mixture to obtain a precursor.

In some embodiments, in the first pre-mixture, a mass ratio of the active material to the additive is (80-120):(1-20).

In some embodiments, in the second pre-mixture, a mass ratio of the active material to the additive is (40-80):(1-10).

In some embodiments, the mixing at least two groups of pre-mixtures to prepare a precursor comprise mixing at least three groups of pre-mixtures to prepare the precursor.

In some embodiments, the mixing at least three groups of pre-mixtures to prepare the precursor comprises sequentially mixing the pre-mixture in a high to low order of a mass percent content of the active material in the pre-mixture.

In some embodiments, the at least two groups of pre-mixtures further comprise a third pre-mixture.

In some embodiments, the active material and the first carbon source, in a mass ratio of (10 to 40):(10 to 40), are mixed with a solvent to obtain the third pre-mixture.

In some embodiments, a mass percent content of the active material in the second pre-mixture is greater than a mass percent content of the active material in the third pre-mixture.

In some embodiments, preparing the precursor comprises, mixing the first pre-mixture with a second pre-mixture, and then with the third pre-mixture sequentially to obtain the precursor.

In some embodiments, preparing the precursor comprises, drying the first pre-mixture and dispersing to obtain a dispersed first pre-mixture, and mixing the dispersed first pre-mixture with the second pre-mixture to provide a mixture, and the mixture is dried and mixed with the third pre-mixture to produce precursor.

In some embodiments, in the third pre-mixture, a mass ratio of the active material to the additive is (10 to 40):(1 to 10).

In some embodiments, a flow rate ratio of the first pre-mixture to the second pre-mixture is (1 to 15):1 during the mixing of the first pre-mixture with the second pre-mixture.

In some embodiments, the first pre-mixture is mixed with the second pre-mixture to obtain a mixture, and the mixture is mixed with the third pre-mixture at a flow rate ratio of (1-15):1 during mixing the mixture with the third pre-mixture.

In some embodiments, the precursor or the pre-mixture is further subjected to a densifying process before heating, such that a porosity of the aggregate is ≤10% and a compressive hardness is ≥100 Mpa.

In some embodiments, the densifying process comprises at least one of a fusion process, a pinch extrusion process, a stamping process, an isostatic pressing process, and an impregnation process.

In some embodiments, the fusion process is a mechanical fusion.

In some embodiments, a speed of the fusion machine for the mechanical fusion is 500 r/min to 3000 r/min.

In some embodiments, a blade gap width of the fusion machine for the mechanical fusion is from 0.01 cm to 0.5 cm.

In some embodiments, the mechanical fusion is performed for at least 0.5 h.

In some embodiments, the heating the precursor further comprises a drying process.

In some embodiments, the drying is performed at a temperature of 30° C. to 400° C. for 1 h to 15 h.

In some embodiments, the heating is performed at a temperature of 600° C. to 1200° C. for 1 h to 15 h.

In some embodiments, a protective gas is introduced during the heating.

In some embodiments, the protective gas comprises at least one of nitrogen, helium, neon, argon, and krypton.

In some embodiments, the method further comprises carbon-coating the aggregate.

In some embodiments, the carbon-coating the aggregate comprises: mixing the precursor with a second carbon source for heating.

In some embodiments, a mass ratio of the precursor to the second carbon source is (30-100):(10-70).

In some embodiments, the carbon-coating comprises mixing the aggregate with a second carbon source for carbonization.

In some embodiments, the second carbon source comprises at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, and asphalt.

In some embodiments, a mass ratio of the aggregate to the second carbon source is (30 to 100):(10 to 70).

In some embodiments, the carbonization is performed at a temperature of 600° C. to 1200° C. for 1 h to 15 h.

The present disclosure provides a negative electrode material, comprising an aggregate, wherein the aggregate comprises an active material and a carbon material, the carbon material is dispersed in the active material and based on 100% by mass of the aggregate, a mass percent content of the active material on a surface of the aggregate is less than a mass percent content of the active material in the aggregate.

The present disclosure further provides a lithium ion battery, comprising the above negative electrode material, or the negative electrode material prepared by the above method.

DESCRIPTION OF DRAWINGS

FIG. 2 is a flowchart of a method for preparing a negative electrode material according to an embodiment of the present disclosure.

DESCRIPTION OF EMBODIMENTS

Figure 1:
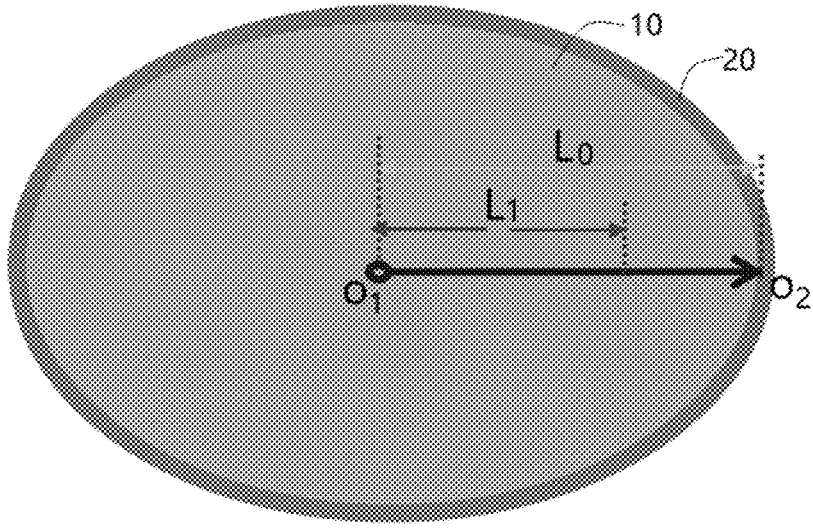
FIG. 1 is a schematic structural diagram of a negative electrode material according to an embodiment of the present disclosure.

Preferred embodiments the present disclosure are described as follows, it should be noted that modifications and adaptations may be made to a person skilled in the art without departing from the principles of the present disclosure, which are also deemed to fall within the scope of the present disclosure.

In an embodiment, as shown in FIG. 1, it provides a negative material, which includes an aggregate 10, the aggregate including an active material and a carbon material; wherein a mass percent content of the active material in the aggregate is gradually reduced from a center to a surface of the aggregate.

The mass percent content of the active material in the aggregate from the center to the surface of the aggregate is measured by the following method:

EDS spot scanning was performed from a center of the SEM section of the aggregate to a surface using an energy spectrometer to measure the mass percent content of the active material in the aggregate at different locations.

The negative electrode material of the present embodiment includes an aggregate including an active material and a carbon material, and a great number of active material particles are located at a center of the aggregate core, and the number of the active material particles gradually decreases away from the center of the core of the aggregate, that is, the mass percent content of the active material in the aggregate is gradually reduced from the center to the surface of the aggregate, such structure facilitates to control an expansion of the active material inside the aggregate, and avoid disruption on the surface carbon layer due to the active material expansion effect, improve the stability of the SEI film on the surface of negative electrode material, provide good surface interface stability, and reduce an expansion rate of the negative electrode material having the added active material, thereby improving cycling stability performance of the negative electrode material, and battery cycle performance.

Specifically, in the aggregate, the active material is distributed in the carbon material, preferably, the active material is dispersed in the carbon material at a certain concentration gradient.

In some embodiments, a total mass percent of the active material is from 5% to 90%, based on 100% by mass of the aggregate.

In some embodiments, the active material has a total mass percent content of 5% to 80%, based on 100% by mass of the aggregate; specifically, the active material may have a mass percent content of 5%, 7%, 10%, 20%, 25%, 35%, 40%, 50%, 55%, 60%, 70%, 75%, 80%, or the like, although other values within the ranges described above may be used, which are not defined herein.

In some embodiments, the mass ratio of the active material to the carbon material is gradually reduced from the center to the surface of the aggregate;

The mass percent of the carbon material in the aggregate was tested according to the test method for the mass percent of the active in the aggregate, the ratio thereof is the mass ratio of the active substance and the carbon material.

In the structure of the aggregate, the greater number of active material particles and less carbon material are located at the center of the aggregate core, while the number of active material particles are gradually reduced way from the center of the core, and the amount of the carbon material increases, that is the mass ratio of the active material to the carbon material is gradually reduced from the center to the surface of the aggregate, this structure is more conducive to controlling the expansion of the active material inside the aggregate, avoiding disruption on the surface layer due to the active material expansion effect, increasing the stability of the SEI film on the surface of negative electrode material, providing good surface interface stability, and reducing the expansion rate of negative electrode material with the added active material, thereby improving cycling stability performance of the negative electrode material and cell cycle performance.

In some embodiments, the active material has a mass percent content of 2% to 55% on a surface of the aggregate. Specifically, the mass percent content of the active material on the surface of the aggregate may be 2%, 5%, 7.5%, 10%, 12.5%, 15%, 20%, 22.5%, 25%, 27.5%, 30%, 35%, 40%, 45%, 50%, or 55%, etc., although other values within the ranges described above may be used, which are not defined herein.

The mass percent content of the active material on the surface of the aggregate is defined as: the mass percent content of the active material at any point on the surface of the aggregate; the test method is to perform the EDS spot scanning at any point on a SEM section edge of the aggregate using a spectrometer to obtain the mass percent content of the active material on the surface of the aggregate.

In some embodiments, a maximum value of the mass ratio of the active material to the carbon material in the aggregate is E, a minimum value thereof is F, and $E-F \geq 0.5$. The aggregate formed within this range has a structure that is more conducive to controlling the expansion of the active material inside the aggregate, avoiding disruption on the surface layer due to the active material expansion effect, increasing the stability of the SEI film on the surface of negative electrode material, providing good surface interface stability, reducing the expansion rate of negative electrode material with the added active material, thereby improving cycling stability performance of the negative electrode material and cell cycle performance; preferably, $E-F \geq 2$.

Alternatively, $E-F$ may be 0.5, 0.8, 1, 1.5, 2, 2.1, 2.3, 2.5, 2.8, 3.0, 3.5, 4.0, 5.5, etc., which is not limited herein.

In some embodiments, the total mass ratio of the active material to the carbon material ranges from 0.5 to 8. In this embodiment, the total mass ratio of the active material to the carbon material refers to the ratio of the total mass of the active material in the aggregate to the total mass of the carbon material. Specifically, the total mass ratio of the active material to the carbon material may be 0.5, 1, 1.5, 2, 2.6, 3, 3.9, 4, 4.8, 5, 5.3, 6, 6.7, 7.2, or 8, etc., although other values within the ranges described above may be used, which are not defined herein.

In some embodiments, referring to FIG. 1, an EDS spot scan test is performed on an aggregate SEM section from a surface-to-center region using a spectrometer, the mass ratio of the active material to the carbon material is defined as T, and N tests are performed in a region, where $N \geq 10$. A is a minimum value of the T values in the N test results, B is a maximum value of the T values in the N ($N \geq 10$) test results, a distance from the aggregate surface to the center is $L_0$ μm, a distance from a center of the test region to a center of the aggregate is $L_1$ μm, and the T value for the center of the test region is defined as $T_0$, $T_0$ satisfies the relationship: $T_0 \leq B - (B-A) L_1/L_0$. The aggregate material that satisfies this relationship has a more densified internal part, stronger compressive stress, and has a more stable structure, and the active material is better concentrated at an internal core location of the aggregate, meanwhile inhibiting expansion of negative electrode material during charging and discharging.

In some embodiments, the active material refers to a material that can react with lithium, and intercalates/deintercalates lithium, that is a type of materials that can increase the capacity of negative electrode material.

Specifically, the active material includes at least one of Li, Na, K, Sn, Ge, Si, $SiO_x$, Fe, Mg, Ti, Zn, Al, P, and Cu; wherein $0<x<2$.

The active material may be a metal element, in some embodiments, specifically the active material may be Si particles, Sn particles, Ge particles, Al particles, in further embodiments, the active material may also be a silicon lithium alloy, a silicon magnesium alloy, or the like, although, it is noted that in some cases the active material includes elemental particles or an alloy thereof, or a composition of different active materials.

In some embodiments, the active material has a median particle size ranging from 1 nm to 300 nm, such as 1 nm, 5 nm, 10 nm, 15 nm, 20 nm, 30 nm, 40 nm, 50 nm, 100 nm, 200 nm, or 300 nm, etc., although other values within the ranges described above may be used, which are not defined herein. Active materials in nanoscale has high surface energy, and tend to agglomerate during charging and discharging, and good structural characteristics of the particles can inhibit expansion of the active material volume. But if the active material in nanoscale has smaller particle size, it has higher surface energy, which make it tends to agglomerate during charging and discharging, and if the particle size of the active material is too small, the production cost is relatively high. Preferably, the active material has a median particle size from 1 nm to 300 nm, more preferably from 1 nm to 100 nm.

In some embodiments, the carbon material includes a graphite based carbon material and a non-graphite based carbon material.

In some embodiments, the graphite based carbon material includes natural graphite and/or artificial graphite, wherein the artificial graphite includes mesocarbon microbeads; and the non-graphite based carbon material includes at least one of amorphous carbon, crystalline carbon, hard carbon, and soft carbon.

In particular, the technical solutions provided by the present disclosure by concentrating the active material in the internal part of an aggregate to inhibit material expansion can be applied to different carbon negative electrode material.

In some embodiments, the aggregate further includes at least one of a metal oxide, and a conductive enhancer.

In some embodiments, the metal oxide has a chemical formula of $M_xO_y$, $0.2 \leq y/x \leq 3$, wherein M includes at least one of Sn, Ge, Fe, Cu, Ti, Na, Mg, Al, Ca, or Zn; specifically, the metal oxide can be $GeO_2$, $SnO_2$, ZnO, $TiO_2$, $Fe_3O_4$, MgO, CuO, and the like. The volume expansion change rate of the selected metal oxide in the lithium deintercalation process is lower than the active material. Thus, compounding the metal oxide with the active material can reduce expansion of the active material, which improves long cycle performance.

In some embodiments, the metal oxide is in a form of a sheet and/or a long strip.

In some embodiments, the metal oxide has an aspect ratio greater than 2. It is noted that when the metal oxide is in a form of a long strip, the aspect ratio specifically refers to a ratio of a length of the metal oxide to the particle size of the metal oxide, wherein the particle size refers to a maximum linear distance between two points on the section perimeter perpendicular to the length of the metal oxide in the form of long strip. When the metal oxide is in the form of a sheet, the aspect ratio specifically refers to the ratio of a length to a width of the metal oxide in the form of sheet. Specifically, the metal oxide may have an aspect ratio of 2, 2.5, 3, 3.5, 4, 4.5, 5, 6, 7, 8, 9, 12, 15, 17, 18, 22, etc., although other values within the ranges described above may be used, which are not defined herein. When the aspect ratio of the metal oxide is greater than 2, the physical bonding force of the metal oxide to the active material may be increased, thereby improving the inhibition and buffering effect on the volume expansion of the active material, and increasing the cycle performance of the negative electrode.

In some embodiments, the mass ratio of the metal oxide to the active material is 1 to 20:100. Specifically, the mass ratio of the metal oxide to the active material may be 1:100, 1.5:100, 2:100, 3:100, 4.5:100, 5:100, 6:100, 7:100, 8:100, 9:100, and the like. Although other values within the ranges described above may be used, which are not defined herein.

In the aggregate, the metal oxide and the active material are distributed in the aggregate with a carbon material filled between the active material and the metal oxide.

In some embodiments, a conductive enhancer is added to the aggregate which, in one aspect, can provide more carrier transport channels, thereby enhancing the transport of carriers inside the material; on the other hand, also provides excellent mechanical properties, and enhance the stability of the material as a support for the structure.

In some embodiments, the mass ratio of the conductive enhancer to the active material is from 0.01 to 20:100. Specifically, the mass ratio can be 0.01:100, 1:100, 2.5:100, 3:100, 5:100, 7.5:100, 10:100, 12.5:100, 15:100, 20:100, and the like. Although other values within the ranges described above may be used, which are not defined herein.

In some embodiments, the conductivity of the conductive enhancer is $10^0$ S/m to $10^8$ S/m. In particular, the conductivity of the conductive enhancer can be 1 S/m, 10 S/m, 100 S/m, $10^3$ S/m, $10^4$ S/m, $10^5$ S/m, $10^8$ S/m, or the like.

In some embodiments, the conductive enhancer is in a form of a sheet and/or a long strip.

In some embodiments, the conductive enhancer has an aspect ratio of 2 to 5000. It is noted that when the conductive enhancer is in a form of a long strip, the aspect ratio specifically refers to a ratio of a length of the particle to the particle size of the particle, wherein the particle size refers to a maximum linear distance between two points on a section perimeter perpendicular to the length of the conductive enhancer in the form of long strip. When the conductive enhancer is in the form of a sheet, the aspect ratio specifically refers to a ratio of a length to a width of the conductive enhancer in the form of a sheet. Specifically, the aspect ratio of the conductive enhancer may be 2, 30, 46, 150, 360, 670, 800, 900, 1500, 2000, 3000, 4000, 5000, etc., although other values within the ranges described above may be used, which are not defined herein. The conductive enhancer having an aspect ratio within the above range, has superior mechanical properties, may serve as a support for the structure to enhance the stability of the material, thereby improving the inhibition and buffering effect on the volume expansion of the active material, and increasing the cycling performance of negative electrode.

Specifically, the conductive enhancer includes an alloy material and an alloy thereof and/or a conductive carbon.

In some embodiments, the alloy material includes at least one of zinc alloy, aluminum alloy, copper alloy, silicon alloy, nickel alloy, and a titanium alloy.

In some embodiments, the conductive carbon includes one of graphite fibers, carbon nanotubes, graphite sheets, conductive carbon fibers, and graphene.

In some embodiments, a porosity of the aggregate is ≤10% and the compressive hardness of the aggregate is ≥100 Mpa.

In this embodiment, the porosity of the aggregates is relatively lower, that is the solidity thereof is rather high, which, on the one hand, helps to increase an energy density of a composite material, on the other hand, for the composite material with high solidity, even if the surface thereof is destroyed, the electrolyte does not readily osmoses into an interior of the aggregates, which facilitates to protect the active material particles at interior of the aggregates, reduce the probability of contact of the electrolyte with the active material, thereby facilitating the formation of a stable solid electrolyte membrane; and the aggregates with high densification have a high compressive hardness, and are able to hedge against the stress effects of expansion, improve the structural stability of negative electrode material, which can effectively suppress expansion of the negative electrode material, reduce an expansion rate thereof, thereby improving cell cycle performance.

In some embodiments, the porosity of the aggregate is ≤10%, the porosity of the aggregate may be specifically 10%, 9%, 9.5%, 8%, 8.5%, 7.5%, 7%, 6.5%, 6%, or 5%, and so on, although other values within the ranges described above may be used, which are not defined herein. It will be understood that the porosity of the aggregate is low, that is the solidity thereof is high, which facilitates to form a stable solid electrolyte membrane, and reduce the electrolyte's contact with the active material. Preferably, the porosity of the aggregate is ≤5%, more preferably the porosity of the aggregate is ≤3%.

The compressive hardness of the aggregate is ≥100 Mpa; the compressive hardness of the aggregate may be specifically 100 Mpa, 250 Mpa, 300 Mpa, 450 Mpa, 500 Mpa, 750 Mpa, 900 Mpa, 1150 Mpa, 1200 Mpa, or 1250 Mpa, or the like, although other values within the above ranges may be used herein without limitation. As the aggregate has strong rigidity, and the particle structure thereof is stable, it can resist certain volume expansion stress, thereby reducing swelling and improving battery cycling stability. Preferably, the aggregate has a compressive hardness of ≥200 Mpa, and more preferably, an aggregate compressive hardness of ≥400 Mpa.

In some embodiments, the aggregate density satisfies the following relationship: a difference between a test density of the aggregate and a theoretical density of the aggregate is ≤5%, and the difference is less as the density of the aggregate particles get closer to the theoretical density, which means pores inside the particles is fewer, and the aggregate particles are denser, it is advantageous to form a stable solid electrolyte membrane, and reduce the contact of the electrolyte with the active material.

In particular, the aggregate density is calculated as follows: $(\rho2-\rho1)/\rho2 \le 5\%$, wherein $\rho1$ is a test density of the aggregate, and $\rho2$ is a theoretical density of the aggregate; $\rho2$ is a sum of a value of multiplying a mass percent content of each component in the aggregate and a theoretical density of each component.

The following method is used to obtain the test density $\rho2$ of the aggregate:

weighing an empty pycnometer with a mass of m, filling the pycnometer with distilled water and weighing and record the mass as m1; washing the pycnometer, and drying, adding a certain amount of aggregate to the pycnometer, weighing and record the mass as m2, then adding distilled water to full-fill the pycnometer, weighing and record the mass as m2 as m3, a volume of the pycnometer $V1=(m1-m)/\rho_{water}$, volume of the active material $V2=V1-(m3-m2)/\rho_{water}$, test density of the active material $\rho1=(m2-m)/V2$, and $\rho_{water}$ is a density of the distilled water.

In a specific example, when the aggregate includes the active material and the carbon material, $\rho2$=mass percent content of the active material in the aggregate*theoretical density of active material+mass percent content of the carbon material in the aggregate*theoretical density of carbon material.

When the aggregate includes the active material, the metal oxide, and the carbon material, $\rho2$=mass percent content of the active material in the aggregate*theoretical density of the active material+mass percent content of the metal oxide in the aggregate*theoretical density of metal oxide+mass percent content of the carbon material in the aggregate*theoretical density of carbon material.

When the aggregate includes the active material, the metal oxide, the conductive enhancer, and the carbon material, $\rho2$=mass percent content of the active material in the aggregate*theoretical density of the active material+mass percent content of the metal oxide in the aggregate*theoretical density of metal oxide+mass percent content of the conductive enhancer in the aggregate*theoretical density of the conductive enhancer+mass percent content of the carbon material in the aggregate*theoretical density of carbon material.

Further, the negative electrode material further includes a carbon layer 20 coated on at least part of the surface of the aggregate 10, preferably the carbon layer is distributed on the surface of the aggregate, the carbon layer including amorphous carbon.

In some embodiments, the carbon layer has a thickness of 10 nm to 2000 nm. As can be understood, the carbon layer coating the surface of the aggregate is capable of reducing the contact of the active material with the electrolyte, reducing the production of the passivation film, and increasing the reversible capacity of the battery.

In particular, the thickness of the carbon layer can be 10 nm, 50 nm, 80 nm, 100 nm, 150 nm, 200 nm, 250 nm, 300 nm, 350 nm, 400 nm, 450 nm, 600 nm, 1000 nm, 1500 nm, or 2000 nm, among others, although other values within the ranges described above may be used, which are not defined herein. If the carbon layer is too thick, a transmission efficiency of the lithium-ion will be reduced, for the material, which is not conducive to charging and discharging in a large rate, and it reduces an overall performance of the negative electrode material. If the carbon layer is too thin, it is not conducive to increasing the conductivity of the negative electrode material, and a volume expansion inhibition to the material is weak, resulting in poor long cycle performance Preferably, the thickness of the carbon layer is from 50 nm to 800 nm; more preferably, the thickness of the carbon layer is from 100 nm to 500 nm.

In some embodiments, the negative electrode material has a median particle size of 0.5 μm to 30 μm; specifically may be 0.5 μm, 1 μm, 5 μm, 8 μm, 10 μm, 13 μm, 15 μm, 18 μm, 20 μm, 25 μm, or 30 μm, or the like, although other values within the ranges described above may be used, which are not defined herein. It is to be understood that if the average particle size of the negative electrode material is controlled within the above range, it facilitates to improve cycling performance of the negative electrode material.

In some embodiments, the specific surface area of negative electrode material is $\leq 10$ m$^2$/g, specifically the specific surface area may be 10 m$^2$/g, 8 m$^2$/g, 7 m$^2$/g, 5 m$^2$/g, 3 m$^2$/g, 2 m$^2$/g, 1 m$^2$/g, or 0.5 m$^2$/g, etc., although other values within the ranges described above may be used, which are not defined herein. It is to be understood that the specific surface area of negative electrode material to be controlled within the range described above helps to inhibit volume expansion, and improve negative electrode material performance. The specific surface area is measured by a Mcgrams specific surface area tester.

The median particle size in the present disclosure refers to an average particle size, the physical meaning of which is the particle size that corresponds when the cumulative particle size distribution percentage of the particles reaches 50%, which is tested by a Malvern particle size meter. The Malvern particle size meter take advantage of the scattering phenomenon of particles on light, and the particle size distribution of the measured particles is comprehensively converted according to the distribution of scattered light energy.

It is to be noted that the negative electrode material of the various embodiments described above may be arbitrarily combined without contradiction, such as combining specific surface area with porosity and compressive hardness of the aggregate, and the like.

In another aspect, the present disclosure provides a preparation method of negative electrode material, the method including the following steps:

Step S10, mixing at least two groups of pre-mixtures to obtain a precursor, wherein each group of pre-mixture includes an active material, a first carbon source, and an solvent, and the mass percent content of the active material in the at least two groups of pre-mixtures is different;

Step S20, heating the precursor to carbonize the first carbon source to obtain an aggregate.

The resulting negative electrode material in the embodiment includes an aggregate, the aggregate includes active material and carbon material, the mass percent content of the active material in the aggregate gradually decreases from the center to the surface of the aggregate.

In the preparation method of this embodiment, the pre-mixture including an active material, a carbon source, and a solvent, the pre-mixtures having active materials of different mass percent content are mixed, and heated to obtain the aggregate. The mass percent content of the active material in the aggregate is gradually reduced from the center to the surface of the aggregate, such a structure helps to control the expansion of the active material inside the aggregate, avoid disruption on the carbon layer of the surface due to the active material expansion effect, increase the stability of the SEI film on the surface of negative electrode material, and provide good surface interface stability, thereby improving the cycle stability performance of the material, reducing the expansion rate, and making the process simple controllable.

The preparation method of the present disclosure is described in detail below in connection with the embodiments:

Step S10, mixing at least two groups of pre-mixtures to obtain a precursor, wherein each group of pre-mixture includes an active material, a first carbon source, and a solvent, and the mass percent content of the active material in the at least two groups of pre-mixtures is different.

It is to be understood that preparation step of each group of pre-mixture specifically comprises: mixing the active material, the first carbon source, and the solvent.

In some embodiments, the precursor may be obtained by mixing two groups of pre-mixtures; or at least three groups of pre-mixtures.

In some embodiments, the step of mixing the at least three groups of pre-mixtures includes: sequentially mixing the pre-mixtures based on a high to low sequence of mass percent content of the active material in corresponding pre-mixtures; sequentially mixing the groups of pre-mixtures based on a high to low sequence of the mass percent of the active material in corresponding pre-mixtures by preparing the above at least three groups of pre-mixtures having different active material content concentrations, in which the pre-mixtures having high active material content is considered as a central core, and then mixing the central core with pre-mixtures having low active material concentration in sequence, and heating to obtain an aggregate. From the surface of the particle to the center of the particle in the aggregate, the proportion of active material gradually increases.

In some embodiments, a difference between the maximum value of the mass percent content of the active material and the minimum value of the mass percent in the at least two groups of pre-mixtures is 20% to 90%. Specifically, the difference between the maximum value of the mass percent content of the active material and the minimum value of the mass percent content is 20%, 25%, 30%, 35%, 45%, 50%, 55%, 65%, 75%, 80%, or 90%; although other values within the ranges described above may be used, which are not defined herein.

In some embodiments, the active material includes at least one of Li, Na, K, Sn, Ge, Si, Fe, SiO$_x$(0<x<2), Mg, Ti, Zn, Al, P, and Cu; the active material may be a metal element, in some embodiments the active material may be specifically Si particles, Sn particles, Ge particles, and Al particles; in further embodiments, the active material may also be a silicon lithium alloy, a silicon magnesium alloy, or the like, although, it is noted that in some cases the active material includes elemental particles or an alloy thereof, or a composition of different active materials.

In some embodiments, the first carbon source includes at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, asphalt.

In some embodiments, the solvent includes organic solvent.

In some embodiments organic solvent includes at least one of methanol, ethanol, ethylene glycol, propanol, isopropanol, glycerol, n-butanol, isobutanol, and pentanol.

In some embodiments, at least one group of the pre-mixtures further includes at least one of an additive, a metal oxide, and a conductive enhancer.

In some embodiments, at least one group of pre-mixtures of the at least two groups of pre-mixtures in preparation of a precursor steps is added with at least one of an additive, a metal oxide, and a conductive enhancer.

It is to be understood that when two groups of pre-mixtures are mixed to prepare the precursor, at least one of the additives, the metal oxide, and the conductive enhancers may be added in one of the two groups of pre-mixtures, or may be added in the two groups of pre-mixtures, and simultaneously, and the types of the additive, the metal oxide, and the conductive enhancer in each group of pre-mixtures may be the same or may be different, which are not limited herein.

The additives may be effective to enhance the stability of the connection of the active material to the carbon material, thereby forming a strong system, and reducing an expansion rate of the electrode sheet.

In some embodiments, the additive includes at least one of a surfactant and a coupling agent.

The surfactant includes at least one of n-octadecanoic acid, lauric acid, polyacrylic acid, sodium dodecyl benzene sulfonate, n-eicosanoic acid, palmitic acid, tetradecanoic acid, undecanoic acid, cetyltrimethylammonium bromide, and polyvinylpyrrolidone.

The coupling agent includes a silane coupling agent and/or a titanate coupling agent. The silane coupling agent includes γ-aminopropyltriethoxysilane, γ-glycidoxypropylt-rimethoxysilane, or γ-methacryloxypropyltrimethoxysilane.

In some embodiments, the metal oxide has a chemical formula of $M_xO_y$, $0.2 \leq y/x \leq 3$, wherein M includes at least one of Sn, Ge, Fe, Cu, Ti, Na, Mg, Al, Ca, and Zn.

In some embodiments, the metal oxide is in a form of a sheet and/or a long strip.

In some embodiments, the metal oxide has an aspect ratio greater than 2.

In some embodiments, a mass ratio of the metal oxide to the active material is 1 to 20:100.

In some embodiments, a mass ratio of the conductive enhancer to the active material is from 0.01 to 20:100.

In some embodiments, a conductivity of the conductive enhancer is $10^0$ S/m to $10^8$ S/m.

In some embodiments, the conductive enhancer is in a form of a sheet and/or a long strip.

In some embodiments, the conductive enhancer has an aspect ratio of 2 to 5000.

In some embodiments, the conductive enhancer includes at least one of an alloy material and a conductive carbon.

In some embodiments, the alloy material includes at least one of zinc alloy, aluminum alloy, copper alloy, silicon alloy, nickel alloy, and titanium alloy.

In some embodiments, the conductive carbon includes one of graphite fibers, carbon nanotubes, graphite sheets, conductive carbon fibers, and graphene.

In some embodiments, a mixing method of the active material, the first carbon source, and the solvent may include magnetic stirring, mechanical stirring, ultrasonic dispersion, milling dispersion, and the like, preferably, milling dispersion is used to enable the active material to disperse apart, and to avoid agglomeration of the active material together, and the active material may be dispersed into smaller nanoparticles.

Specifically, each group of pre-mixtures is subjected to a wet ball milling prior to mixing and preparing the precursor, such that particle size of the active material particle is between 1 nm and 300 nm.

In some embodiments, wet ball-milling for dispersion can be performed for 0.5 h to 10 h, and components can be mixed and made more uniform by sufficient milling.

In some embodiments, each group of pre-mixtures is mixed for drying.

In some embodiments, the drying is performed at 30° C. to 400° C. for 1 h to 15 h.

In some embodiments, each group of pre-mixtures is subjected to centrifugation treatment after mixing.

In some embodiments, centrifugation treatment has a rotation speed of 100 rpm to 3000 rpm, for example, the rotation speed may be 100 rpm, 500 rpm, 1000 rpm, 2000 rpm, or 3000 rpm, and the centrifugation treatment time is 10 min to 60 min, for example, may be 10 min, 20 min, 30 min, 40 min, or 50 min. The aggregate is advantageously formed by rotate and centrifuge the mixed solution.

In some embodiments, a densifying process to precursor or the pre-mixture is further included, the connection of the active material and the carbon material may be effectively enhanced by the densifying process, pores between the active material and the carbon material to be obtained is decreased, the densification is increased such that the poros-ity of the aggregate is ≤10%, and the compressive hardness of the aggregate is ≥100 Mpa.

In some embodiments, the densifying process includes at least one of a fusion process, a pinch extrusion process, a stamping process, an isostatic pressing process, and an impregnation process. Certainly, the densifying process is not limited to the above method, so long as the porosity of the aggregate is ≤10% and the compressive hardness is ≥100 MPa.

In some embodiments, the fusion process is a mechanical fusion. Through the fusion process, the connection of the active material to the carbon material may be effectively enhanced, while reducing pores between each other and improving densification.

In some embodiments, during the fusion process, the speed of the fusion machine is 500 r/min to 3000 r/min, specifically 500 r/min, 1000 r/min, 1500 r/min, 2000 r/min, 2500 r/min, or 3000 r/min, etc., a blade gap width of the fusion machine for the mechanical fusion is 0.01 cm to 0.5 cm, specifically 0.01 cm, 0.05 cm, 0.1 cm, 0.15 cm, 0.2 cm, 0.25 cm, 0.3 cm, or 0.5 cm, etc.; the fusion process is performed for at least 0.5 h, specifically 0.5 h, 0.8 h, 0.9 h, 1.0 h, 1.5 h, or 2 h, etc., which is not defined herein.

In some embodiments, precursor of the present embodi-ment may be prepared by mixing two pre-mixture.

In particular, the at least two groups of pre-mixtures include a first pre-mixture and a second pre-mixture.

In some embodiments, an active material and a first carbon source, in a mass ratio of (80 to 120):(1 to 20), are mixed with a solvent to prepare the first pre-mixture; an active material, and a first carbon source, in a mass ratio of (40 to 80):(1 to 30), are mixed with a solvent to obtain the second pre-mixture.

Specifically, in the first pre-mixture, the mass ratio of the active material to the first carbon source may be 100:12.9, 100:10.9, 100:12.9, 100:15.9, 100:11.9, 100:15.9, 100:22.9, and the like, although other values within the ranges described above may be used, which are not defined herein.

Specifically, in the second pre-mixture, the mass ratio of the active material to the first carbon source may be 60:22.9, 50:20.9, 67:12.9, 50:22.9, 70:21.9, 78:20.9, and the like, although other values within the ranges described above may be used, which are not defined herein.

In some embodiments, the mass ratio of the active mate-rial to the additive in the first pre-mixture may be (80 to 120):(1 to 20); 100:12.9, 100:10.9, 100:12.9, 100:15.9, 100:11.9, 100:15.9, 100:22.9, etc., although other values within the ranges described above may be used, which are not defined herein.

In some embodiments, the mass ratio of the active mate-rial to the additive in the second pre-mixture may be (40-80):(1-10); the mass ratio of the active material to the additive may be 40:22.9, 50:20.9, 45:12.9, 55:22.9, 60:21.9, 70:20.9, etc., although other values within the ranges described above may, Certainly, not be defined herein.

In some embodiments, the mass percent content of the active material in the first pre-mixture is greater than the mass percent content of the active material in the second pre-mixture.

Specifically, the step of preparing the precursor at this time includes mixing the first pre-mixture and the second pre-mixture to provide the precursor.

During mixing the first pre-mixture with the second pre-mixture, a flow rate ratio of the first pre-mixture to the second pre-mixture is (1 to 15):1; specifically, it may be 1:1, 3:1, 5:1, 8:1, 10:1, 12:1, or 15:1, and so on, although other values within the ranges described above may be used, which are not defined herein. It is to be understood that the content of each component in the first pre-mixture and the second pre-mixture is different, by controlling an addition ratio of the dispersed product and the second pre-mixture and a flow rate, it facilitates obtaining an aggregate having a concentration gradient.

Still further, preparing a precursor specifically comprises: drying the first pre-mixture for dispersing.

In some embodiments, a drying temperature is from 30° C. to 400° C., specifically 30° C., 40° C., 50° C., 80° C., 100° C., 120° C., 150° C., 180° C., 200° C., 250° C., 280° C., 300° C., or 400° C., and the like, and a time for the drying process is 1 h to 15 h, specifically 1 h, 3 h, 5 h, 7 h, 9 h, 10 h, 12 h, or 15 h, etc. The drying process may be in a form of, for example, in-furnace drying, freeze drying, blending steam, spray drying, and the like, and the drying process in this embodiment may remove the solvent in a precursor solution as much as possible.

In some embodiments, the dried precursor is further subjected to a densifying process, the densifying process includes a fusion process, the fusion process is a mechanical fusion. Through the fusion process, a connection of the active material to the carbon material may be effectively enhanced, thereby reducing pores between each other and improving densification.

During the fusing, a speed of the fusion machine is 500 r/min to 3000 r/min, specifically 500 r/min, 1000 r/min, 1500 r/min, 2000 r/min, 2500 r/min, or 3000 r/min, etc., a blade gap width of the fusion machine is 0.01 cm to 0.5 cm, specifically 0.01 cm, 0.05 cm, 0.1 cm, 0.15 cm, 0.2 cm, 0.25 cm, 0.3 cm, or 0.5 cm, etc.; and a fusion time is at least 0.5 h, specifically 0.5 h, 0.8 h, 0.9 h, 1.0 h, 1.5 h, or 2 h, etc., which is not defined herein.

In some embodiments, the precursor of the present embodiment may be prepared by mixing three groups of pre-mixture.

Specifically, a third pre-mixture can be included in addition to the first pre-mixture and the second pre-mixture; in the present embodiment, the first pre-mixture, the second pre-mixture, and the mixing operation of are all the same as described above, and are not described in detail herein.

In some embodiments, the active material, the first carbon source is prepared in a mass ratio of (10 to 40):(10 to 40) and solvent mixing to provide a third pre-mixture; in particular, the mass ratio of the active material to the first carbon source may be 30:22.9, 30:20.9, 35:12.9, 50:22.9, 30:21.9, 20:20.9, and the like, although other values within the ranges described above may be used, which are not defined herein.

The mass percent content of the active material in the second pre-mixture is greater than the mass percent content of the active material in the third pre-mixture.

In some embodiments, the mass ratio of the active material to the additive in the third pre-mixture is (10 to 40):(1 to 10); in particular, the mass ratio of the active material to the additive may be 30:5.5, 30:3.5, 35:5.5, 20:5.5, 10:8.5, 20:4.5, etc., although other values within the ranges described above may be used, which are not defined herein.

The step of preparing precursor includes: mixing the first pre-mixture in sequence with a second pre-mixture, a third pre-mixture to obtain the precursor; specifically, firstly preparing three groups of pre-mixtures having different concentrations of the active material, wherein the content of the active material in the first pre-mixture is the highest, the content of the active material in the third pre-mixture is the lowest; then mixing the first pre-mixture as a central core of the high active material content, with the second pre-mixture, the third pre-mixture in low concentration sequentially; and finally heating to obtain the aggregate. The proportion of the active material increases gradually from the surface to the center of the particles.

In some embodiments, the flow rate ratio of the first pre-mixture to the second pre-mixture is (1 to 15):1, and the flow rate ratio of a mixture obtained by mixing the first pre-mixture and the second pre-mixture to the third pre-mixture is (1 to 15):1.

Further, the step of preparing the precursor is specifically: drying the first pre-mixture for dispersing; mixing the dispersed first pre-mixture and the second pre-mixture to provide a mixture, and mixing the mixture after drying with the third pre-mixture to produce precursor.

In some embodiments, the flow rate ratio of the mixture to the third pre-mixture during the mixing process is (1 to 15):1; specifically may be 1:1, 3:1, 5:1, 8:1, 10:1, 12:1, or 15:1, and so on, although other values within the ranges described above may be used, which are not defined herein.

In some embodiments, the mixing process also requires centrifugation. The centrifugation is performed for 30 min to 60 min, specifically 30 min, 35 min, 40 min, 45 min, 50 min, 55 min, or 60 min, and so on, although other values within the above ranges can be used. The aggregate is advantageously formed by rotating and centrifuging the mixed solution.

In some embodiments, mixing the mixture with the third pre-mixture further includes a drying process.

In some embodiments, the drying process has a temperature of 30° C. to 400° C., specifically 30° C., 40° C., 50° C., 80° C., 100° C., 120° C., 150° C., 180° C., 200° C., 250° C., 280° C., 300° C., or 400° C., and the like, the drying process has a time of 1 h to 15 h, specifically 1 h, 3 h, 5 h, 7 h, 9 h, 10 h, 12 h, or 15 h, etc., The drying process can be in a form of, for example, in-furnace drying, freeze drying, blending steam, spray drying, and the like, and drying process in this embodiment can remove the solvent in precursor solution as much as possible.

In some embodiments, the dried precursor is subjected to a densifying process, the densifying process includes a fusion process, the fusion process is a mechanical fusion. Through the fusion process, a connection of the active material to the carbon material may be effectively enhanced, thereby improving densification.

During the fusing, a speed of the fusion machine is 500 r/min to 3000 r/min, specifically 500 r/min, 1000 r/min, 1500 r/min, 2000 r/min, 2500 r/min, or 3000 r/min, etc., a blade gap width of the fusion machine is 0.01 cm to 0.5 cm, specifically 0.01 cm, 0.05 cm, 0.1 cm, 0.15 cm, 0.2 cm, 0.25 cm, 0.3 cm, or 0.5 cm, etc.; and a fusion time is at least 0.5 h, specifically 0.5 h, 0.8 h, 0.9 h, 1.0 h, 1.5 h, or 2 h, etc., which is not defined herein.

Step S20, heating the precursor, carbonizing the first carbon source to obtain an aggregate.

In some embodiments, the heating includes, for example, vacuum sintering, hot-press sintering, or atmospheric sintering. The temperature of the heating is from 400° C. to 1200° C., which may be, for example, 500° C., 600° C., 700° C., 800° C., 900° C., 1000° C., 1200° C., 1200° C., and the like. Preferably, the temperature of the heating is from 600° C. to 1000° C.

In some embodiments, the time for heating 1 h to 15 h may be, for example, 1 h, 2 h, 3 h, 4 h, 5 h, 6 h, 7 h, 8 h, 9 h, or the like.

A heating rate during the heating process is 1° C./min to 30° C./min, specifically 1° C./min, 5° C./min, 10° C./min, 15° C./min, 20° C./min, 25° C./min or 30° C./min, and the like. For example, it may be, preferably, the heating rate is 1° C./min to 15° C./min.

A protective gas is introduced during the heating process, which includes at least one of nitrogen, helium, neon, argon, and krypton.

In some embodiments, the step of carbon-coating the aggregate is further included.

In some embodiments, the carbon-coating process includes mixing the precursor with a second carbon source for heating.

In some embodiments, the second carbon source includes at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, and asphalt.

In some embodiments, the precursor has a particle size of 0.5 nm to 20 nm, specifically 0.5 nm, 1 μm, 5 μm, 8 μm, 10 nm, 13 nm, 15 nm, 18 nm, or 20 nm, or the like, although other values within the ranges described above may be used, which are not defined herein.

It is to be understood that if the average particle size of the negative electrode material is controlled within the above range, it facilitates to improve cycling performance of the negative electrode material.

In some embodiments, a mass ratio of precursor to the second carbon source is (30-100):(10-70); specifically, the mass ratio of precursor to the second carbon source is 100:25, 100:35, 100:45, 100:55, 100:65, etc., although other values within the ranges described above may be used, which are not defined herein.

In some embodiments, a mixing method may include magnetic stirring, mechanical stirring, ultrasonic dispersion, milling dispersion, and the like.

In some embodiments, other ways of carbon-coating the aggregate may further be used, specifically, the step of the carbon-coating includes mixing the aggregate with a second carbon source for carbonization treatment to form a carbon layer on the surface of the aggregate.

In some embodiments, a temperature of carbonization treatment is between 400° C. and 1200° C., for example, it may be 500° C., 600° C., 700° C., 800° C., 900° C., 1000° C., 1100° C., 1200° C., and the like. Preferably, the temperature of the carbonization treatment is from 600° C. to 1000° C.

In some embodiments, the time of carbonization treatment may be 1 h-15 h, for example, 1 h, 2 h, 3 h, 4 h, 5 h, 6 h, 7 h, 8 h, 9 h, or the like.

In some embodiments, a heating rate during the carbonization treatment is 1° C./min to 30° C./min, specifically 1° C./min, 5° C./min, 10° C./min, 15° C./min, 20° C./min, 25° C./min or 30° C./min, and the like. For example, it may be, preferably, the heating rate during the heating process is 1° C./min to 15° C./min.

In some embodiments, a protective gas is introduced during the carbonization process, which includes at least one of nitrogen, helium, neon, argon, and krypton.

It is to be noted that the negative electrode material of the present embodiment may not be coated with carbon and is not limited to the two carbon-coating methods described above.

In the present solution, the negative electrode material prepared with the above preparation method includes an aggregate, the aggregate including an active material and a carbon material, the mass percent content of the active material in the aggregate is gradually reduced from the center to the surface of the aggregate. This structure helps to control the expansion of the active material inside the aggregate, avoid disruption of the active material expansion effect on the carbon layer of the surface, increase the stability of the SEI film on the surface of negative electrode material, and provide good surface interface stability, thereby improving the cycling stability performance of the material and reducing the expansion rate.

The present disclosure in turn provides a negative electrode material including an aggregate, the aggregate includes an active material and a carbon material, the carbon material is dispersed between the active materials. Based on 100% by mass percent content of the aggregate, the mass percent content of the active material of the aggregate surface is less than the mass percent content of the active material within the aggregate.

The present disclosure further provides a lithium ion battery including the negative electrode material described above.

Those skilled in the art will appreciate that the method for preparing the lithium ion battery described above only represents an embodiment of the present disclosure. Other methods commonly used in the art may be used without departing from the scope of the present disclosure.

The following several embodiments further illustrate the embodiments of the present disclosure. The embodiments herein are not limited to the specific examples described below. Variations may be made as appropriate within the scope of the independent claims.

Example 1

The preparation method of the negative electrode material of the present embodiment includes the following steps:

(1) Nano-silicon having a median particle size of 100 nm, polyvinylpyrrolidone, and polyvinyl chloride, in a mass ratio of 100:9:12.9, were added to an ethylene glycol solution for ultrasonic process of 10 min, followed by milling for dispersion in a ball mill for 2 h to obtain a first pre-mixture; Nano-silicon having a median particle size of 100 nm, polyvinylpyrrolidone, and polyvinyl chloride, in a mass ratio of 60:5.5:22.9, were added to an ethylene glycol solution for ultrasonic process of 10 min, followed by milling for dispersion in a ball mill for 2 h to obtain a second pre-mixture.

(2) The first pre-mixture and the second pre-mixture were introduced into the mixing apparatus, a flow rate ratio of the first pre-mixture to the second pre-mixture was controlled to be 8:2, followed by spin centrifugation for 30 min, and a drying treatment at 190° C. for 5 h to obtain the precursor.

(3) The precursor was mixed with glucose in a mass ratio of 50:55 to obtain a mixed material, followed by placement of the mixed material into a box furnace of high temperature and with introduction of nitrogen, the mixed material was heated at 850° C. for 3 h, followed by crushing, and sieving through a 500 mesh screen to obtain a negative electrode material.

The negative electrode material prepared in this example includes an aggregate and a carbon layer coated on the surface of the aggregates, the aggregate includes Nano-silicon and amorphous carbon, the amorphous carbon is dispersed between Nano-silicon, Nano-silicon accounts for 61% of the mass of the aggregate, a mass percent content of the Nano-silicon on the surface of the aggregate is 45%, a total mass ratio of Nano-silicon to amorphous carbon is 1.56. The mass percent content of Nano-silicon in the aggregate was reduced by 26.2% from the center to the surface of the aggregate, the mass ratio of Nano-silicon to amorphous carbon was reduced from the center to the surface of the aggregate to 2.2; a value of E–F in this example was 2.2.

A spot scanning was performed from the SEM section center to the surface of the aggregate, the mass percent content of the active material measured at three different locations in the aggregate is 71.2%, 61.0%, and 45.0%, respectively Any multiple regions inside the aggregate particle was taken for testing, the test region is a 2 $\mu$m$\times$2 $\mu$m square region, a ratio of the mass percent content of Nano-silicon to the mass percent content of amorphous carbon is defined as T, To measured at the center of any test area was counted, and for 80 tests, To satisfy the following relationship: $T_0 \leq 3.2 - 2.2 L_1 / L_0$.

The negative electrode material had a median particle size of 14 $\mu$m, a specific surface area 4.2 m$^2$/g. The aggregate particles were tested using a mercury intrusion method and the aggregate has a porosity of 2.9%.

Example 2

The preparation method of the negative electrode material of the present embodiment includes the following steps:

(1) Nano-silicon having a median particle size of 100 nm, polyvinylpyrrolidone, and polyvinyl chloride, in a mass ratio of 100:9:12.9, were added to an ethylene glycol solution for ultrasonic process of 10 min, followed by milling for dispersion in a ball mill for 2 h to obtain a first pre-mixture; Nano-silicon having a median particle size of 100 nm, polyvinylpyrrolidone, and polyvinyl chloride, in a mass ratio of 60:5.5:22.9, were added to an ethylene glycol solution for ultrasonic process of 10 min, followed by milling of the dispersion for 2 h in a ball mill to provide a second pre-mixture; Nano-silicon having a median particle size of 100 nm, polyvinylpyrrolidone, and polyvinyl chloride, in a mass ratio of 20:2.5:22.9, were added to an ethylene glycol solution for ultrasonic process of 10 min, followed by milling for dispersion in a ball mill for 2 h to obtain a third pre-mixture.

(2) The first pre-mixture was dried at 290° C. for 3 h to obtain a first precursor, then the first precursor was added to an ethanol solvent for a milling dispersion for 8 h to obtain a first precursor dispersion liquid; the first precursor dispersion liquid and the second pre-mixture were fed into a mixing apparatus, a flow rate ratio of the first precursor dispersion liquid to the second pre-mixture was controlled to be 8:2, followed by spin centrifugation for 30 min, and a drying treatment at 190° C. for 5 h to obtain a second precursor.

(3) The second precursor and the third pre-mixture were fed into the mixing apparatus, the flow rate ratio of the second precursor to the third pre-mixture is controlled to be 2:2, followed by a drying process at 150° C. for 4 h to obtain a third precursor.

(4) The third precursor was mixed with glucose in a mass ratio of 50:55 to obtain a mixed material, followed by placement of the mixed material into a box furnace of high temperature fed with nitrogen, the mixed material was heated at 850° C. for 3 h, followed by crushing, and sieving through a 500 mesh screen to obtain a negative electrode material.

The negative electrode material prepared in this example includes an aggregate and a carbon layer coated on the surface of the aggregates, the aggregate includes Nano-silicon and amorphous carbon, the amorphous carbon is dispersed between Nano-silicon, Nano-silicon accounts for 55% of the mass of the aggregate, a mass percent content of the Nano-silicon on the surface of the aggregate is 31%, a total mass ratio of Nano-silicon to amorphous carbon is 1.22. The mass percent content of Nano-silicon in the aggregate was reduced by 30.4% from the center to the surface of the aggregate, the mass ratio of Nano-silicon to amorphous carbon was reduced from the center to the surface of the aggregate to 1.05; a value of E–F in this example was 1.05.

A spot scanning was performed from the SEM section center to the surface of the aggregate, the mass percent content of the active material measured at three different locations in the aggregate is 61.4%, 55.3%, 47.4%, and 33.0%, respectively.

Any multiple regions inside the aggregate particle was taken for testing, the test region is a 2 $\mu$m$\times$2 $\mu$m square region, a ratio of the mass percent content of Nano-silicon to the mass percent content of amorphous carbon is defined as T, count $T_0$ measured at the center of any test area, and for 80 tests, To satisfy the following relationship: $T_0 \leq 1.5 - 1.05 L_1 / L_0$.

The negative electrode material had a median particle size of 11.8 $\mu$m, a specific surface area 4.2 m$^2$/g.

Example 3

The preparation method of the negative electrode material of the present embodiment includes the following steps:

(1) Nano-silicon having a median particle size of 70 nm, acrylic acid, and glucose were added to an ethanol solution in a mass ratio of 100:4.9:10.9 for ultrasonic process of 10 min, followed by milling the dispersion for 3 h with a ball mill to obtain a first pre-mixture; Nano-silicon having a median particle size of 70 nm, acrylic acid, and glucose were added to an ethanol solution in a mass ratio of 70:3.5:20.9 for ultrasonic process of 10 min, followed by milling dispersion in a ball mill for 2 h to obtain a second pre-mixture; Nano-silicon having a median particle size of 70 nm, acrylic acid, and glucose were added to an ethanol solution in a mass ratio of 30:1.5:20.9 for ultrasonic process of 30 min, followed by milling dispersion in a ball mill for 2 h to obtain a third pre-mixture.

(2) The first pre-mixture was dried at 160° C. for 2 h to obtain the first precursor, and then the first precursor was added to the glycol solvent for a milling dispersion for 4 h to obtain a first precursor dispersion liquid; the first precursor dispersion liquid and the second pre-mixture were fed into a mixing apparatus, a flow rate ratio of the first precursor dispersion liquid to the second pre-mixture was controlled to be 8:2, followed by spin centrifugation for 30 min, and a drying treatment at 180° C. for 5 h to obtain a second precursor.

(3) The second precursor and the third pre-mixture were fed into the mixing apparatus, the flow rate ratio of the second precursor to the third pre-mixture is controlled to be 4:2, followed by a drying process at 250° C. for 4 h to obtain a third precursor.

(4) The third precursor was subjected to a mechanical fusion, a speed of the fusion machine was 500 r/min; a width of a blade gap width of the fusion machine was 0.15 cm; the fusion was performed for 1.5 h to obtain a fused material. The fused material was placed in a heat treatment furnace, then nitrogen was introduced, the fused material was heated to 900° C. for 3 h to obtain an aggregate.

The negative electrode material prepared in this example includes an aggregate and a carbon layer coated on the surface of the aggregates, the aggregate includes Nano-silicon and amorphous carbon, the amorphous carbon is dispersed between Nano-silicon, Nano-silicon accounts for 46% of the mass of the aggregate, a mass percent content of the Nano-silicon on the surface of the aggregate is 27%, a total mass ratio of Nano-silicon to amorphous carbon is 0.85. The mass percent content of Nano-silicon in the aggregate was reduced by 29% from the center to the surface of the aggregate, the mass ratio of Nano-silicon to amorphous carbon was reduced from the center to the surface of the aggregate to 0.9; a value of E–F in this example was 0.9.

A spot scanning was performed from the SEM section center to the surface of the aggregate, the mass percent content of the active material measured at three different locations in the aggregate is 56.0%, 46.3%, 33.4% and 27.0%, respectively Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 80 tests, To satisfy the following relationship: $T_0 \leq 1.26 - 0.9L_1/L_0$.

The negative electrode material had a median particle size of 11 $\mu m$, a specific surface area 2.2 $m^2/g$. The aggregate particles were tested using a mercury intrusion method and the aggregate has a porosity of 3.3%. The aggregate particles were tested using a nanoindenter, resulting in an average compressive hardness of 151 Mpa, and a difference of a test density of the aggregate and a theoretical density of the Nano-silicon and amorphous carbon in the aggregate is 1.5%.

Example 4

The preparation method of negative electrode material of the present embodiment includes the following steps:

(1) Nano-silicon having a median particle size of 50 nm, oleic acid, and glucose, in a mass ratio of 100:5:12.9, were added to an isopropanol solution for ultrasonic process of 10 min, followed by a milling dispersion for 4 h in a ball mill to obtain a first pre-mixture; Nano-silicon having a median particle size of 50 nm, oleic acid, and glucose, in a mass ratio of 65:5.5:12.9, were added to an isopropanol solution for ultrasonic process of 10 min, followed by a milling dispersion in a ball mill for 2 h to obtain a second pre-mixture. Nano-silicon having a median particle size of 50 nm, oleic acid, and glucose, in a mass ratio of 15:3.5:12.9, were added to an isopropanol solution, for ultrasonic process of 40 min followed by a milling dispersion in a ball mill for 2 h to obtain a third pre-mixture.

(2) The first pre-mixture was dried at 360° C. for 2 h to obtain the first precursor, then the first precursor was added to the glycol solvent for a milling dispersion for 7 h to obtain a first precursor dispersion liquid; the first precursor dispersion liquid and the second pre-mixture were fed into a mixing apparatus, a flow rate ratio of the first precursor dispersion liquid to the second pre-mixture was controlled to be 5:3, followed by spin centrifugation for 30 min and a drying treatment at 180° C. for 5 h to obtain a second precursor.

(3) The second precursor and the third pre-mixture were fed into a mixing apparatus, the flow rate ratio of the second precursor to the third pre-mixture is controlled to be 4:5, followed by a drying process at 250° C. for 4 h to obtain the third precursor.

(4) The third precursor was subjected to a mechanical fusion, a speed of the fusion machine was 400 r/min; a width of a blade gap width of the fusion machine was 0.25 cm; the fusion was performed for 1.5 h to obtain a fused material. The fused material was placed in a heat treatment furnace and then nitrogen was introduced, the fused material was heated to 920° C. for 3 h to obtain an aggregate.

(5) The aggregate was mixed with phenolic resin in a mass ratio of 100:25 to obtain a mixed material, followed by placement of the mixed material into a box furnace of high temperature, then nitrogen was introduced, the fused material was heated to 1050° C. for 2 h, followed by crushing and sieving through a 500 mesh screen to obtain a negative electrode material.

The negative electrode material prepared in this example includes an aggregate and a carbon layer coated on the surface of the aggregates, the aggregate includes Nano-silicon and amorphous carbon, the amorphous carbon is dispersed between Nano-silicon, Nano-silicon accounts for 51% of the mass of the aggregate, a mass percent content of the Nano-silicon on the surface of the aggregate is 43%, a total mass ratio of Nano-silicon to amorphous carbon is 1.17. The mass percent content of Nano-silicon in the aggregate was reduced by 11.5% from the center to the surface of the aggregate, the mass ratio of Nano-silicon to amorphous carbon was reduced from the center to the surface of the aggregate to 0.5; a value of E–F in this example was 0.5.

A spot scanning was performed from the SEM section center to the surface of the aggregate, the mass percent content of the active material measured at three different locations in the aggregate is 54.5%, 50.3%, 46.4% and 43.0%, respectively.

Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 80 tests, To satisfy the following relationship: $T_0 \leq 1.32 - 0.5L_1/L_0$.

The negative electrode material had a median particle size of 5.2 $\mu m$, a specific surface area 4.2 $m^2/g$. The aggregate particles were tested using a mercury intrusion method and the aggregate has a porosity of 3.9%; and tested using a nanoindenter, resulting in an average compressive hardness of 165 Mpa, and a difference of a test density of the aggregate and a theoretical density of the Nano-silicon and amorphous carbon in the aggregate is 1.1%.

Example 5

The preparation method of negative electrode material of the present embodiment includes the following steps:

(1) Nano-silicon having a median particle size of 20 nm, stearic acid, and citric acid, in a mass ratio of 100:1.9:15.9, are added to the ethylene glycol solution for ultrasonic process of 10 min, followed by milling dispersion for 2 hours in a ball mill to provide a first pre-mixture; simultaneously Nano-silicon having a median particle size of 20 nm, stearic acid, and sucrose, in a mass ratio of 50:5.5:22.9 are added to the ethylene glycol solution for ultrasonic process of 10 min, followed by milling dispersion in a ball mill for 2 hours to obtain a second pre-mixture; Nano-silicon having a median particle size of 20 nm, stearic acid, and sucrose in a mass ratio of 30:3.5:22.9, are added to the ethylene glycol solution, for ultrasonic process of 10 min, followed by milling dispersion in a ball mill for 2 hours to provide a third pre-mixture.

(2) The first pre-mixture was dried at 140° C. for 6 h to obtain a first precursor, and then the first precursor was added to a glycol solvent for a milling dispersion for 8 h to obtain a first precursor dispersion liquid; the first precursor dispersion liquid and the second pre-mixture were fed into a mixing apparatus, a flow rate ratio of the first precursor dispersion liquid to the second pre-mixture was controlled to be 3:3, followed by spin centrifugation for 30 min, and a drying treatment at 280° C. for 5 h to obtain a second precursor.

(3) The second precursor and the third pre-mixture were fed into the mixing apparatus, the flow rate ratio of the second precursor and the third pre-mixture is controlled to be 6:2, followed by a drying process at 450° C. for 4 h to obtain a third precursor.

(4) The third precursor was mixed with glucose in a mass ratio of 100:35 to obtain a mixed material, followed by placement of the mixed material in a box furnace of high temperature, nitrogen was introduced, and mixed material was heated at 7850° C. for 3 h, followed by crushing, and sieving through a 500 mesh screen to obtain a negative electrode material.

The negative electrode material prepared in this example includes an aggregate and a carbon layer coated on the surface of the aggregates, the aggregate includes Nano-silicon and amorphous carbon, the amorphous carbon is dispersed between Nano-silicon, Nano-silicon accounts for 69% of the mass of the aggregate, a mass percent content of the Nano-silicon on the surface of the aggregate is 54%, a total mass ratio of Nano-silicon to amorphous carbon is 2.22. The mass percent content of Nano-silicon in the aggregate was reduced by 21.2% from the center to the surface of the aggregate, the mass ratio of Nano-silicon to amorphous carbon was reduced from the center to the surface of the aggregate to 1.86; a value of E–F in this example was 1.86.

The negative electrode material had a median particle size of 18 μm, and a specific surface area 3.2 m²/g.

Example 6

The preparation method of negative electrode material of the present embodiment includes the following steps:

(1) Nano-tin having a median particle size of 100 nm, polyvinylpyrrolidone, and fructose, in a mass ratio of 100:4:11.9, were added to an ethylene glycol solution for ultrasonic process of 10 min followed by milling dispersion for 5 hours in a ball mill to obtain a first pre-mixture; meanwhile Nano-tin having a median particle size of 100 nm, polyvinylpyrrolidone, and fructose, in a mass ratio of 45:8.5:21.9 were added to the ethylene glycol solution for ultrasonic process of 10 min, followed by milling dispersion in a ball mill for 2 hours to obtain a second pre-mixture.

(2) A first pre-mixture and a second pre-mixture were fed into a mixing apparatus, the flow rate ratio of the first pre-mixture to the second pre-mixture was controlled to be 4:6, followed by spin centrifugation for 30 min, and a drying treatment at 300° C. for 4 h to obtain a precursor.

(3) The precursor was mixed with glucose in a mass ratio of 100:45 to obtain a mixed material, followed by placement of the mixed material in a box furnace of high temperature, nitrogen was introduced, and the mixed material was heated at 750° C. for 3 h, followed by crushing, and sieved through a 500 mesh screen to obtain negative electrode material.

The negative electrode material prepared in this example includes an aggregate and a carbon layer coated on the surface of the aggregates, the aggregate includes Nano-tin and amorphous carbon, the amorphous carbon is dispersed between Nano-tin, Nano-tin accounts for 66% of the mass of the aggregate, a mass percent content of the Nano-tin on the surface of the aggregate is 47.5%, a total mass ratio of Nano-tin to amorphous carbon is 3.04. The mass percent content of Nano-tin in the aggregate was reduced by 32.2% from the center to the surface of the aggregate, the mass ratio of Nano-tin to amorphous carbon was reduced from the center to the surface of the aggregate to 3.04; a value of E–F in this example was 3.04.

A spot scanning was performed from the SEM section center to the surface of the aggregate, the mass percent content of the active material measured at three different locations in the aggregate is 79.7%, 66.3%, 55.4% and 47.5%, respectively.

The negative electrode material had a median particle size of 3.9.2 μm and a specific surface area 4.5 m²/g.

Example 7

The preparation method of negative electrode material of the present embodiment includes the following steps:

(1) Nano-germanium having a median particle size of 100 nm, sodium dodecyl benzene sulfonate, and phenolic resin, in a mass ratio of 100:3.5:15.9 are added to an ethanol solution for ultrasonic process of 10 min, followed by milling dispersion for 2 hours in a ball mill to provide a first pre-mixture; meanwhile Nano-germanium having a median particle size of 100 nm, sodium dodecyl benzene sulfonate, and polyvinyl chloride, in a mass ratio of 50:4.5:20.9, are added to the ethanol solution for ultrasonic process of 10 min, followed by milling dispersion for 6 hours in a ball mill to provide a second pre-mixture; the Nano-germanium having a median particle size of 100 nm, sodium dodecyl benzene sulfonate, and polyvinyl chloride, in a mass ratio of 20:1.5:20.9 are added to the ethanol solution for ultrasonic process of 40 min, followed by milling dispersion for 6 hours in a ball mill to provide a third pre-mixture.

(2) The first pre-mixture was dried at 120° C. for 5 h to obtain a first precursor, then the first precursor was added to a butanol solvent for a milling dispersion for a milling dispersion for 6 h to obtain a first precursor dispersion liquid; the first precursor dispersion liquid and the second pre-mixture were fed into a mixing apparatus, a flow rate ratio of the first precursor dispersion liquid to the second pre-mixture was controlled to be 9:3, followed by a drying treatment at 280° C. for 5 h to obtain a second precursor.

(3) The second precursor and the third pre-mixture were fed into the mixing apparatus, the flow rate ratio of the second precursor to the third pre-mixture is controlled to be 8:2, and followed by a drying process at 350° C. for 4 h to obtain the third precursor.

(4) The third precursor was subjected to a mechanical fusion, a speed of the fusion machine was 550 r/min; a width of a blade gap width of the fusion machine was 0.15 cm; the fusion was performed for 3 h to obtain a fused material. The fused material was placed in a heat treatment furnace and then nitrogen was introduced, the fused material was heated to 800° C. for 3 h to obtain an aggregate.

(5) The aggregate was mixed with glucose in a mass ratio of 100:65, followed by placement of the mixed material into a box furnace of high temperature, nitrogen was introduced, and the mixed material was heated at 950° C. for 3 h, followed by crushing and sieving through a 500 mesh screen to obtain a negative electrode material.

The negative electrode material prepared in this example includes an aggregate and a carbon layer coated on the surface of the aggregates, the aggregate includes Nano-germanium and amorphous carbon, the amorphous carbon is dispersed between Nano-germanium, Nano-germanium accounts for 54% of the mass of the aggregate, a mass percent content of the Nano-germanium on the surface of the aggregate is 38%, a total mass ratio of Nano-germanium to amorphous carbon is 1.17. The mass percent content of Nano-germanium in the aggregate was reduced by 31.4% from the center to the surface of the aggregate, the mass ratio of Nano-germanium to amorphous carbon was reduced from the center to the surface of the aggregate to 1.31; a value of E–F in this example was 1.31.

A spot scanning was performed from the SEM section center to the surface of the aggregate, the mass percent content of the active material measured at three different locations in the aggregate is 69.5%, 60.3%, 55.7%, 50.4%, 45.4% and 38.0%, respectively.

Any multiple regions inside the aggregate particle was taken for testing, the test region is a 2 $\mu$m×2 $\mu$m square region, a ratio of the mass percent content of Nano-germanium to the mass percent content of amorphous carbon is defined as T, count $T_0$ measured at the center of any test area, and for 80 tests, To satisfy the following relationship: $T_0 \leq 2.26 - 1.31 L_1/L_0$.

The negative electrode material had a median particle size of 13.9 $\mu$m, a specific surface area 2.9 m²/g. The aggregate particles were tested using a mercury intrusion method and the aggregate has a porosity of 4.9%, and tested using a nanoindenter, resulting in an average compressive hardness of 138 Mpa, and a difference of a test density of the aggregate and a theoretical density of the Nano-germanium and amorphous carbon in the aggregate is 1.7%.

Example 8

The preparation method of negative electrode material of the present embodiment includes the following steps:

(1) Nano-aluminum having a median particle size of 100 nm, polyacrylamide, and citric acid are added to the propanol solution in a mass ratio of 100:7.9:22.9 for ultrasonic process of 10 min, followed by a milling dispersion in a ball mill for 8 hours to obtain a first pre-mixture; Nano-aluminum having a median particle size of 100 nm, polyacrylamide, and citric acid in a mass ratio of 48:3.5:12.9 are added to the propanol solution for ultrasonic process of 10 min, and the second pre-mixture followed by the ball mill milling dispersion for 5 hours; meanwhile Nano-aluminum having a median particle size of 100 nm, polyacrylamide, and citric acid, in a mass ratio of 22:2.5:12.9 are added to a propanol solution for ultrasonic process of 10 min, followed by milling in a ball mill dispersion for 5 hours to obtain a third pre-mixture.

(2) The first pre-mixture was dried at 220° C. for 5 h to obtain a first precursor, then the first precursor was added to a n-pentanol solvent for a milling dispersion, the dispersion time was 2 h to obtain a first precursor dispersion liquid; the first precursor dispersion liquid and the second pre-mixture were fed into a mixing apparatus, the flow rate ratio of the first precursor dispersion liquid to the second pre-mixture was controlled to be 9:9, followed by a drying at 280° C. for 4 h to obtain a second precursor.

(3) The second precursor and the third pre-mixture were fed into the mixing apparatus, the flow rate ratio of the second precursor and the third pre-mixture is controlled to be 8:5, followed by drying at 350° C. for 2 h to obtain a third precursor.

(4) The third precursor was mixed with glucose in a mass ratio of 100:55 to obtain a mixed material, followed by placement of the mixed material into a box furnace of high temperature, nitrogen was introduced, the mixed material was heated at 950° C. for 4 h, followed by crushing and sieving through a 500 mesh screen to obtain a negative electrode material.

The negative electrode material prepared in this example includes an aggregate and a carbon layer coated on the surface of the aggregates, the aggregate includes Nano-aluminum and amorphous carbon, Nano-aluminum accounts for 49% of the mass of the aggregate, a mass percent content of the Nano-aluminum on the surface of the aggregate is 33%, a total mass ratio of Nano-aluminum to amorphous carbon is 0.96. The mass percent content of Nano-aluminum in the aggregate was reduced by 12.02% from the center to the surface of the aggregate, the mass ratio of Nano-aluminum to amorphous carbon was reduced from the center to the surface of the aggregate to 2.0; a value of E–F in this example was 2.0.

A spot scanning was performed from the SEM section center to the surface of the aggregate, the mass percent content of the active material measured at five different locations in the aggregate is 45.02%, 41.3%, 38.5%, 35.6% and 33.0%, respectively.

The negative electrode material had a median particle size of 17.9 $\mu$m, a specific surface area 1.95 m²/g.

Example 9

This example differs from Example 1 in that the precursor is not coated with carbon; that is, step (3) comprises placing precursor into a box furnace of high temperature, introducing nitrogen, heating the precursor at 950° C. for 3 h, followed by sieving through a 500 mesh screen to obtain a negative electrode material.

The negative electrode material prepared in this example includes an aggregate and a carbon layer coated on the surface of the aggregates, the aggregate includes Nano-silicon and amorphous carbon, Nano-silicon accounts for 65% of the mass of the aggregate, a mass percent content of the Nano-silicon on the surface of the aggregate is 53%, a total mass ratio of Nano-silicon to amorphous carbon is 1.86. The mass percent content of Nano-silicon in the aggregate was reduced by 16.7% from the center to the surface of the aggregate, the mass ratio of Nano-silicon to amorphous carbon was reduced from the center to the surface of the aggregate to 1.18; a value of E–F in this example was 1.18.

Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 80 tests, To satisfy the following relationship: $T_0 \leq 2.37 - 1.18$ $L_1/L_0$.

The negative electrode material had a median particle size of 9.6 $\mu m$, a specific surface area 5.2 $m^2/g$. The aggregate particles were tested using a mercury intrusion method and the aggregate has a porosity of 2.1%, and tested using a nanoindenter, resulting in an average compressive hardness of 149 Mpa, and a difference of a test density of the aggregate and a theoretical density of the nano-silicon and amorphous carbon in the aggregate is 1.8%.

Example 10

This example differs from Example 2 in that the first pre-mixture and the second pre-mixture in step 1) are different from that of Example 2, the step 1 comprises: a Nano-silicon having a median particle size of 100 nm, SiO having an aspect ratio of 22, polyvinylpyrrolidone, and polyvinyl chloride in a mass ratio of 80:3:2:2.5 were added to an ethylene glycol solution for ultrasonic process of 10 min, followed by milling dispersion in a ball mill for 2 h to obtain a first pre-mixture; a Nano-silicon having a median particle size of 100 nm, SiO having an aspect ratio of 22, polyvinylpyrrolidone, and polyvinyl chloride in a mass ratio of 55:1.5:1:2.9 were added to an ethylene glycol solution for ultrasonic process of 10 min, followed by milling dispersion in a ball mill for 2 h to provide a second pre-mixture.

The negative electrode material prepared in this example includes an aggregate and a carbon layer coated on the surface of the aggregates, the aggregate includes Nano-silicon, SiO and amorphous carbon, Nano-silicon accounts for 58% of the mass of the aggregate, a total mass ratio of Nano-silicon to amorphous carbon is 1.49. The mass percent content of Nano-silicon in the aggregate was reduced by 20.9% from the center to the surface of the aggregate, the mass ratio of Nano-silicon to amorphous carbon was reduced from the center to the surface of the aggregate to 1.23; a value of E–F in this example was 1.23.

Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 93 tests, To satisfy the following relationship: $T_0 \leq 2.13 - 1.23$ $L_1/L_0$.

The negative electrode material had a median particle size of 13 $\mu m$, a specific surface area 3.8 $m^2/g$. The aggregate particles were tested using a mercury intrusion method and the aggregate has a porosity of 6.9%; and tested using a nanoindenter, resulting in an average compressive hardness of 258 Mpa, and a difference of a test density of the aggregate and a theoretical density of the Nano-silicon, SiO particles and amorphous carbon in the aggregate is 1.2%.

Example 11

This example differs from Example 2 in that the first pre-mixture and the second pre-mixture in step 1) are different from that of Example 2, the step 1 comprises: a Nano-silicon having a median particle size of 100 nm, NiSi alloy having an aspect ratio of 15, polyvinylpyrrolidone, and polyvinyl chloride in a mass ratio of 100:4.5:2:2.5 were added to an ethylene glycol solution for ultrasonic process of 10 min, followed by milling dispersion in a ball mill to for 2 h to obtain the first pre-mixture; a Nano-silicon having a median particle size of 100 nm, NiSi alloy having an aspect ratio of 15, polyvinylpyrrolidone, and polyvinyl chloride in a mass ratio of 45:1:25:2.9 were added to the ethylene glycol solution, for ultrasonic process of 10 min, followed by milling dispersion in a ball mill for 2 h to obtain a second pre-mixture.

The negative electrode material prepared in this example includes an aggregate and a carbon layer coated on the surface of the aggregates, the aggregate includes Nano-silicon, SiN alloy and amorphous carbon, Nano-silicon accounts for 55% of the mass of the aggregate, a mass percent content of the Nano-silicon on the surface of the aggregate is 42.8%, a total mass ratio of Nano-silicon to amorphous carbon is 1.35. The mass percent content of Nano-silicon in the aggregate was reduced by 24% from the center to the surface of the aggregate, the mass ratio of Nano-silicon to amorphous carbon was reduced from the center to the surface of the aggregate to 0.92; a value of E–F in this example was 0.92.

Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 55 tests, To satisfy the following relationship: $1.1 \leq T \leq 2.02$, and $T_0 \leq 2.02 - 0.92$ $L_1/L_0$.

The negative electrode material had a median particle size of 11.6 $\mu m$, a specific surface area 4.1 $m^2/g$. The aggregate particles were tested using a mercury intrusion method and the aggregate has a porosity of 2.5%; and tested using a nanoindenter, resulting in an average compressive hardness of 378 Mpa, and a difference of a test density of the aggregate and a theoretical density of the Nano-silicon, NiSi alloy and amorphous carbon in the aggregate is 0.8%.

Example 12

This example differs from Example 2 in that the first pre-mixture and the second pre-mixture in step 1) are different from that of Example 2, the step 1 comprises: Nano-silicon having a median particle size of 100 nm, $TiO_2$, $FeSi_2$, polyvinylpyrrolidone, and polyvinyl chloride, in a mass ratio of 100:3:3.5:2:30 are added to an ethylene glycol solution for ultrasonic process of 10 min, followed by milling dispersion in a ball mill for 2 h to obtain a first pre-mixture; Nano-silicon having a median particle size of 100 nm, polyvinylpyrrolidone, and polyvinyl chloride in a mass ratio of 65:1:22.9 were added to an ethylene glycol solution, for ultrasonic process of 10 min, followed by milling dispersion in a ball mill for 2 h to obtain a second pre-mixture.

The negative electrode material prepared in this example includes an aggregate and a carbon layer coated on the surface of the aggregate, the aggregate includes Nano-silicon, and amorphous carbon, Nano-silicon accounts for 45% of the mass of the aggregate, a mass percent content of the Nano-silicon on the surface of the aggregate is 37.5%, a total mass ratio of Nano-silicon to amorphous carbon is 0.98. The mass percent content of Nano-silicon in the aggregate was reduced by 14.2% from the center to the surface of the aggregate, the mass ratio of Nano-silicon to amorphous carbon was reduced from the center to the surface of the aggregate to 0.85; a value of E–F in this example was 0.85.

Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 100 tests, To satisfy the following relationship: $T_0 \leq 1.45 - 0.85$ $L_1/L_0$.

The negative electrode material had a median particle size of 12.5 $\mu m$, a specific surface area 5.1 $m^2/g$. The aggregate particles were tested using a mercury intrusion method and the aggregate has a porosity of 4.4%; and tested using a nanoindenter, resulting in an average compressive hardness of 498 Mpa, and a difference of a test density of the aggregate and a theoretical density of the Nano-silicon, $TiO_2$, $FeSi_2$ and amorphous carbon in the aggregate is 0.8%.

Example 13

Negative electrode material was prepared substantially in the same manner as in Example 3 except that no additive was added in this example.

The negative electrode material prepared in this example includes an aggregate and a carbon layer coated on the surface of the aggregate, the aggregate includes Nano-silicon, and amorphous carbon, Nano-silicon accounts for 46% of the mass of the aggregate, a mass percent content of the Nano-silicon on the surface of the aggregate is 27%, a total mass ratio of Nano-silicon to amorphous carbon is 0.85. The mass percent content of Nano-silicon in the aggregate was reduced by 28.5% from the center to the surface of the aggregate, the mass ratio of Nano-silicon to amorphous carbon was reduced from the center to the surface of the aggregate to 0.88; a value of E–F in this example was 0.88.

Any multiple regions inside the aggregate particle was taken for testing, the test region is a 2 $\mu m \times 2$ $\mu m$ square region, a ratio of the mass percent content of Nano-silicon to the mass percent content of amorphous carbon is defined as T, count $T_0$ measured at the center of any test area, and for 55 tests, To satisfy the following relationship: $T_0 \leq 1.29 - 0.88$ $L_1/L_0$.

The negative electrode material had a median particle size of 10.4 $\mu m$, a specific surface area 2.8 $m^2/g$. The aggregate particles were tested using a mercury intrusion method and the aggregate has a porosity of 3.9%; and tested using a nanoindenter, resulting in an average compressive hardness of 98 Mpa, and a difference of a test density of the aggregate and a theoretical density of the Nano-silicon, and amorphous carbon in the aggregate is 2.6%.

Comparative Example 1

The negative electrode material was prepared substantially in the same manner as in Example 2 except that, in this comparative example, only a first pre-mixture was included;

(1) Nano-silicon having a median particle size of 100 nm, polyvinylpyrrolidone, and polyvinyl chloride in a mass ratio of 100:9:12.9 were added to an ethylene glycol solution for ultrasonic process of 10 min, followed by milling dispersion in a ball mill for 2 h to obtain a first pre-mixture.

(2) The first pre-mixture. was dried at 290° C. for 3 h to obtain a first precursor, then the first precursor was added to an ethanol solvent for milling dispersion for 8 h to obtain a first precursor dispersion liquid, followed by drying treatment at 150° C. for 4 h to obtain a first precursor.

(3) The first precursor was mixed with glucose in a mass ratio of 50:55 to obtain a mixed material, followed by placement of the mixed material in a box furnace of high temperature, nitrogen was introduced, and the mixed material was heated at 850° C. for 3, followed by crushing and sieving through a 500 mesh screen to obtain a negative electrode material.

The negative electrode material prepared in this example includes an aggregate and a carbon layer coated on the surface of the aggregate, the aggregate includes Nano-silicon, and amorphous carbon, the amorphous carbon is dispersed between the Nano-silicon, the Nano-silicon accounts for 60% of the mass of the aggregate, a total mass ratio of Nano-silicon to amorphous carbon is 1.5.

A spot scanning was performed from the SEM section center to the surface of the aggregate, the mass percent content of the active material measured at four different locations in the aggregate is 61.0%, 59.3%, 60.4%, 58.8% and 61.4%, respectively.

The negative electrode material had a median particle size of 12.8 $\mu m$, a specific surface area 3.2 $m^2/g$.

Test Methods

Electrochemical cycle performance was tested by the method as follows: dissolving the resulting negative electrode material, conductive agent, and binder in a mass ratio of 94:1:5 in a solvent, controlling a solid content to be 50% and applying to a copper foil current collector for vacuum drying to prepare a negative electrode sheet; and then manufacturing a lithium ion battery with a ternary positive electrode sheet prepared in a conventional mature process, 1 mol/L of LiPF6/vinyl carbonate+dimethyl carbonate+methyl ethyl carbonate (v/v=1:1:1) electrolyte, Celgard 2400 separator, and a housing by a conventional production process. A initial thickness of the electrode sheet of the lithium ion battery was measured to be H0 by a micrometer, a charging and discharging test of lithium ion battery were performed on a Hingo electronics, Inc. LAND battery test system to obtain a first reversible capacity, a primary charge capacity, and a primary discharge capacity on the condition that the charging and discharging is performed at 0.2 C constant current and charging and discharging voltages were limited to 2.75-4.2V at ambient conditions. The first Coulombic efficiency is equaled to a ratio of a first discharge capacity to a first charge capacity.

Thickness of the electrode sheet of the lithium ion battery was measured using a micrometer after 50 cycles, an expansion ratio after 50 cycles=$(H_1 - H_0)/H_0 \times 100\%$.

The discharge capacity was recorded as a remaining capacity of the lithium-ion battery after 100 cycles; a capacity retention ratio=remaining capacity retention/an initial capacity$\times 100\%$. The results of the performance testing described above are as follows:

TABLE 1

| | First Reversible Capacity (mAh/g) | First Coulombic efficiency (%) | Capacity retention (%) after 100 cycles | Electrode sheet expansion (%) after 50 cycles |
|---|---|---|---|---|
| | Performance Comparison Results | | | |
| Example 1 | 1402 | 88.5 | 93.5 | 34.3% |
| Example 2 | 1415 | 88.9 | 94.2 | 35.6% |
| Example 3 | 1375 | 88.9 | 95.0 | 36.6% |
| Example 4 | 1381 | 88.2 | 94.2 | 39.7% |
| Example 5 | 1421 | 88.0 | 95.9 | 35.1% |
| Example 6 | 788.5 | 88.1 | 90.4 | 38.9% |
| Example 7 | 1155 | 89.3 | 94.5 | 36.7% |
| Example 8 | 1022 | 80.4 | 87.4 | 42.1% |
| Example 9 | 1602 | 84.5 | 90.5 | 41.3% |
| Example 10 | 1362 | 87.9 | 95.0 | 33.3% |
| Example 11 | 1381 | 87.1 | 94.9 | 33.9% |
| Example 12 | 1322 | 87.2 | 95.1 | 32.9% |
| Example 13 | 1405 | 86.2 | 90.1 | 45% |
| Comparative Example 1 | 1369 | 87.1 | 86.1 | 47% |

As shown in Table 1, the negative electrode material prepared in Examples 1 to 13 includes an aggregate, and the aggregate include an active material and a carbon material, and the active material component located at the center of the aggregate core accounts for a major proportion of the aggregate, the carbon material component accounts for a minor proportion of the aggregate, while the proportion of the active material component away from the center of the core is gradually decreasing, and the proportion of the carbon material component the is increasing. Such a structure helps to control the expansion of the active material inside the aggregate, avoiding disruption on the carbon layer of the surface due to the active material expansion effect, increase the stability of the SEI film on the surface of negative electrode material, and provide good surface interface stability, thereby improving the cycle stability performance of the material and reducing the expansion rate.

During preparation of the negative electrode material of Example 6, a ratio of the flow rate of the first pre-mixture to flow rate of the second pre-mixture is too small, that is the first pre-mixture having a high active material concentration is mixed with the second pre-mixture having a low active material concentration, reducing a gradient range of the active material component content, that is a T value distribution range is reduced, and a difference in concentration gradient is reduced, which is not conducive to controlling the expansion of the active material inside the aggregate, resulting in a slight drop in cycle retention, and an increase in electrode sheet expansion efficiency.

In Example 8, the glucose, as a carbon source of the precursor, was added in excess such that the proportion of the active material in the final prepared negative electrode material is reduced, the first Coulombic efficiency of the negative electrode material and the cycle capacity retention is decreased.

In Examples 10 to 12, the active material containing the metal oxide and the conductive enhancer, has a higher compressive hardness, and the cycling capacity retention of the negative electrode material is higher, and the volume expansion rate is lower.

The negative electrode material in Example 13 did not has an additive added during the preparation process, the aggregate of active material and carbon material has poor stability, resulting in increased electrode sheet expansion rate.

During preparation of the negative electrode material of Comparative Example 1, a second pre-mixture was not prepared, and only the first pre-mixture was prepared, such that a content ratio of the active substance and the carbon material in the aggregate particles substantially has a single value, that is the active material distribution range tends to be concentrated, the percent content of the active material did not exhibit a gradual decrease from the center to the surface, and percent content of the active material on the surface was smaller than that in the inner part of the aggregate, which is not conducive to inhibiting the expansion rate of negative electrode material.

Although the present disclosure is made in a preferred embodiment, it is not intended to define claims. Any person skilled in the art can make a number of possible changes and modifications without departing from the concept of the disclosure. Therefore, the scope of protection of the disclosure shall be subject to the scope defined in the claims of the disclosure.

While the present disclosure has been disclosed in terms of preferred embodiments and these embodiments are not intended to limit the claims, any possible variations and modifications may be made by a person skilled in the art without departing from the concepts of the present disclosure, and the scope of the present disclosure should, therefore, be determined with reference to the claims.

INDUSTRIAL APPLICABILITY

In summary, the present disclosure provides a negative electrode material, a preparation method thereof, and a lithium ion battery, wherein the negative electrode material includes an aggregate, the aggregate includes an active material and a carbon material; a mass percent content of the active material in the aggregate is gradually reduced from the center to the surface of the aggregate. The negative electrode material provided by the present disclosure are effective in inhibiting a volume expansion of the negative electrode material, thereby improving cycle performance of the battery.

What is claimed is:

1. A negative electrode material, comprising an aggregate, wherein the aggregate comprises a negative active material and a carbon material, wherein a mass percent content of the negative active material in the aggregate is gradually reduced from a center to a surface of the aggregate;

a mass ratio of the negative active material to the carbon material is gradually reduced from the center to the surface of the aggregate;

a maximum value of a mass ratio of the negative active material to the carbon material in the aggregate the is denoted as E, a minimum value thereof is denoted as F, wherein E−F≥0.5; and an EDS point scan test is performed on any region from an edge to a center of a SEM section of the aggregate with a spectrometer, a mass ratio of the negative active material to the carbon material is defined as T, and N tests are performed within the region, wherein N≥10, wherein A represents a minimum value of T in the results of the N tests, B represents a maximum value of T in the results of the N tests, a distance from any point of the surface to a center of the aggregate is $L_0$ μm, a distance of a center of a test region to the center of the aggregate is $L_1$ μm, a T value of the center position of the test region is defined as $T_0$, wherein $T_0$ satisfies a relationship: $T_0 \leq B-(B-A) L_1/L_0$.

2. The negative electrode material according to claim 1, comprising at least one of the following features (1) to (4):

(1) a total mass ratio of the negative active material to the carbon material is 0.5 to 8;

(2) the negative active material has a mass percent content of 5% to 90%, based on 100% by mass of the aggregate;

(3) the negative active material has a mass percent content of 5% to 80%, based on 100% by mass of the aggregate;

(4) the negative active material has a mass percent content of 2% to 55% on the surface of the aggregate.

3. The negative electrode material according to claim 1, comprising at least one of the following features (1) to (6):

(1) the negative active material comprises at least one of Li Na, K, Sn, Ge, Si, $Sio_x$, Fe, Mg, Ti, Zn, Al, Ni, P, and Cu, wherein $0 < x < 2$;

(2) the negative active material has a median particle size ranging from 1 nm to 300 nm;

(3) the carbon material comprises a graphite based carbon material and/or a non-graphite based carbon material;

(4) the carbon material comprises a graphite based carbon material, and the graphite based carbon material comprises natural graphite and/or artificial graphite;

(5) the carbon material comprises a graphite based carbon material, the graphite based carbon material comprises artificial graphite, and the artificial graphite comprises mesocarbon microbeads;

(6) the carbon material comprises a non-graphite based carbon material, and the non-graphite based carbon material comprises at least one amorphous carbon, crystalline carbon, hard carbon, and soft carbon.

4. The negative electrode material according to claim 1, comprising at least one of the following features (1) to (12):

(1) the aggregate further comprises at least one of a metal oxide and a conductive enhancer;

(2) the aggregate further comprises a metal oxide, the metal oxide has a chemical formula of $M_xO_y$, wherein $0.2 \leq y/x \leq 3$, and m comprises at least one of Sn, Ge, Fe, Cu, Ti, Na, Mg, Al, Ca, and Zn;

(3) the aggregate further comprises a metal oxide, and the metal oxide is in a form of a sheet and/or a long strip;

(4) the aggregate further comprises a metal oxide, and the metal oxide has an aspect ratio greater than 2;

(5) the aggregate further comprises a conductive enhancer, and the conductivity enhancer has a conductivity of $10^0$ s/m to $10^8$ s/m;

(6) the aggregate further comprises a conductive enhancer, and the conductive enhancer is in a form of a sheet and/or a long strip;

(7) the aggregate further comprises a conductive enhancer, and the conductivity enhancer has an aspect ratio of 2 to 5000;

(8) the aggregate further comprises a conductive enhancer, the conductive enhancer comprises at least one of an alloy material and a conductive carbon;

(9) the aggregate further comprises a metal oxide, and a mass ratio of the metal oxide to the negative active material is 1 to 20:100;

(10) the aggregate further comprises a conductive enhancer, and a mass ratio of the conductive enhancer to the negative active material ranges from 0.01 to 20:100;

(11) the aggregate further comprises a conductive enhancer, and the conductive enhancer comprises an alloy material, and the alloy material comprises at least one of a zinc alloy, an aluminum alloy, a copper alloy, a silicon alloy, a nickel alloy, and a titanium alloy;

(12) the aggregate further comprises a conductive enhancer, and the conductive enhancer comprises a conductive carbon, and the conductive carbon comprises one of graphite fibers, carbon nanotubes, graphite sheets, conductive carbon fibers, and graphene.

5. The negative electrode material according to claim 1, comprising at least one of the following features (1) to (8):

(1) the negative electrode material further comprises a carbon layer coated on at least part of the surface of the aggregate;

(2) the negative electrode material further comprises a carbon layer coated on at least part of the surface of the aggregate, and a material of the carbon layer comprises graphite and/or amorphous carbon;

(3) the negative electrode material further comprises a carbon layer coated on at least part of the surface of the aggregate, and the carbon layer has a thickness of 10 nm to 2000 nm;

(4) the negative electrode material has a median particle size of 0.5 μm to 30 μm;

(5) the negative electrode material has a specific surface area of $\leq 10$ $m^2$/g;

(6) the aggregate has a porosity of $\leq 10\%$;

(7) the aggregate has a compressive hardness of $\geq 100$ Mpa;

(8) the aggregate density satisfies the following relationship: $(\rho 2 - \rho 1)/\rho 2 \leq 5\%$, wherein $\rho 1$ is a test density of the aggregate, $\rho 2$ is a theoretical density of the aggregate; and $\rho 2$ is a sum of a value of multiplying a mass percent content of each component in the aggregate and a theoretical density of the each component.

6. A negative electrode material, comprising an aggregate, wherein the aggregate comprises a negative active material and a carbon material, the carbon material is dispersed in the negative active material and based on 100% by mass of the aggregate, and a mass percent content of the negative active material on a surface of the aggregate is less than a mass percent content of the negative active material in the aggregate;

a mass ratio of the negative active material to the carbon material is gradually reduced from the center to the surface of the aggregate;

a maximum value of a mass ratio of the negative active material to the carbon material in the aggregate the is denoted as E, a minimum value thereof is denoted as F, wherein $E - F \geq 0.5$; and an EDS point scan test is performed on any region from an edge to a center of a SEM section of the aggregate with a spectrometer, a mass ratio of the negative active material to the carbon material is defined as T, and N tests are performed within the region, wherein $N \geq 10$, wherein A represents a minimum value of T in the results of the N tests, B represents a maximum value of T in the results of the N tests, a distance from any point of the surface to a center of the aggregate is $L_0$ μm, a distance of a center of a test region to the center of the aggregate is $L_1$ μm, a T value of the center position of the test region is defined as $T_0$, wherein $T_0$ satisfies a relationship: $T_0 \leq B - (B-A) L_1/L_0$.

7. A lithium ion battery, comprising the negative electrode material according to claim 1.

* * * * *